(12) United States Patent
Takahashi et al.

(10) Patent No.: US 10,007,073 B2
(45) Date of Patent: Jun. 26, 2018

(54) OPTICAL COMPONENT INCLUDING A HIGH-RELATIVE-REFRACTIVE-INDEX-INDEX-DIFFERENCE OPTICAL FIBER A SINGLE-MODE OPTICAL FIBER AN OPTICAL DEVICE AND A FIXING MEMBER TO FIX A RELATIVE OPSITION

(71) Applicant: FURUKAWA ELECTRIC CO., LTD., Tokyo (JP)

(72) Inventors: Masanori Takahashi, Tokyo (JP); Junichi Hasegawa, Tokyo (JP); Takeshi Yagi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days. days.

(21) Appl. No.: 15/470,282

(22) Filed: Mar. 27, 2017

(65) Prior Publication Data

US 2017/0199341 A1 Jul. 13, 2017

Related U.S. Application Data

(63) Continuation of application No. PCT/JP2015/078830, filed on Oct. 9, 2015.

(30) Foreign Application Priority Data

Oct. 10, 2014 (JP) .................................. 2014-209448
Feb. 4, 2015 (JP) .................................. 2015-020354

(51) Int. Cl.
*G02B 6/14* (2006.01)
*G02B 6/42* (2006.01)
(Continued)

(52) U.S. Cl.
CPC .......... *G02B 6/421* (2013.01); *G02B 6/02395* (2013.01); *G02B 6/14* (2013.01);
(Continued)

(58) Field of Classification Search
CPC .... G02B 6/421; G02B 6/4243; G02B 6/4216; G02B 6/02395; G02B 6/2551; G02B 6/14; G02B 6/4249
See application file for complete search history.

(56) References Cited

U.S. PATENT DOCUMENTS

| 5,475,777 A | 12/1995 | Imoto et al. |
| 6,487,339 B2 * | 11/2002 | Nishikawa ........... G02B 6/2552 385/32 |

(Continued)

FOREIGN PATENT DOCUMENTS

| JP | 4-360106 | 12/1992 |
| JP | 7-13036 | 1/1995 |

(Continued)

OTHER PUBLICATIONS

International Search Report dated Nov. 24, 2015 in PCT/JP2015/078830 filed on Oct. 9, 2015 (with English translation).

(Continued)

*Primary Examiner* — Akm Enayet Ullah
(74) *Attorney, Agent, or Firm* — Oblon, McClelland, Maier & Neustadt, L.L.P.

(57) ABSTRACT

An optical component includes: a high-relative-refractive-index-difference optical fiber; a single-mode optical fiber fusion-spliced to the high-relative-refractive-index-difference optical fiber, a mode-field diameter of the single-mode optical fiber being greater than a mode-field diameter of the high-relative-refractive-index-difference optical fiber at a wavelength of 1550 nm; and an optical device connected to an end surface of the high-relative-refractive-index-difference optical fiber where the single-mode optical fiber is not fusion-spliced. A total of a connection loss between the high-relative-refractive-index-difference optical fiber and the single-mode optical fiber at the wavelength of 1550 nm and a connection loss between the high-relative-refractive- (Continued)

index-difference optical fiber and the optical device at the wavelength of 1550 nm is less than a connection loss at the wavelength of 1550 nm when the single-mode optical fiber is connected to the optical device directly.

16 Claims, 16 Drawing Sheets

(51) Int. Cl.
    *G02B 6/02*     (2006.01)
    *G02B 6/255*     (2006.01)

(52) U.S. Cl.
    CPC ......... *G02B 6/2551* (2013.01); *G02B 6/4216* (2013.01); *G02B 6/4243* (2013.01); *G02B 6/4249* (2013.01)

(56) References Cited

U.S. PATENT DOCUMENTS

| | | | |
|---|---|---|---|
| 6,607,933 B2 * | 8/2003 | Akulova | G02B 6/305 438/29 |
| 7,099,545 B2 * | 8/2006 | Sako | G02B 6/02009 250/227.16 |
| 7,346,258 B2 * | 3/2008 | Ikeda | C03C 13/046 385/144 |
| 7,668,428 B2 * | 2/2010 | Miyabe | G02B 6/02214 385/125 |
| 8,014,645 B2 * | 9/2011 | Suzuki | G02B 6/02042 385/122 |
| 2003/0091289 A1 | 5/2003 | Saito et al. | |
| 2004/0131321 A1 | 7/2004 | Kubo et al. | |
| 2008/0118207 A1 | 5/2008 | Yamamoto et al. | |
| 2013/0152343 A1 * | 6/2013 | Doherty | B62K 21/26 16/430 |
| 2014/0241683 A1 | 8/2014 | Uchida et al. | |
| 2016/0246001 A1 | 8/2016 | Uchida et al. | |

FOREIGN PATENT DOCUMENTS

| | | |
|---|---|---|
| JP | 2001-66438 | 3/2001 |
| JP | 2003-149491 | 5/2003 |
| JP | 2003-156662 | 5/2003 |
| JP | 2004-126563 | 4/2004 |
| JP | 2013-210623 | 10/2013 |
| WO | WO 2006/078007 A1 | 7/2006 |

OTHER PUBLICATIONS

Written Opinion dated Nov. 24, 2015 in PCT/JP2015/078830 filed on Oct. 9, 2015.

* cited by examiner

US 10,007,073 B2

OPTICAL COMPONENT INCLUDING A HIGH-RELATIVE-REFRACTIVE-INDEX-INDEX-DIFFERENCE OPTICAL FIBER A SINGLE-MODE OPTICAL FIBER AN OPTICAL DEVICE AND A FIXING MEMBER TO FIX A RELATIVE OPSITION

CROSS-REFERENCE TO RELATED APPLICATION(S)

This application is a continuation of International Application No. PCT/JP2015/078830, filed on Oct. 9, 2015 which claims the benefit of priority of the prior Japanese Patent Application No. 2014-209448, filed on Oct. 10, 2014 and Japanese Patent Application No. 2015-020354, filed on Feb. 4, 2015, the entire contents of which are incorporated herein by reference.

BACKGROUND

The disclosure relates to an optical component.

A technique has been known in which zirconia ($ZrO_2$) is used as a dopant for improving a refractive index of an optical waveguide forming a planar lightwave circuit (PLC) device made of silica-based glass as a material (for example, see Japanese Laid-open Patent Publication No. 2013-210623). In comparison to Germania ($GeO_2$), $ZrO_2$ is a material whose refractive index is high and thermal expansion coefficient is small. Therefore, it is expected to be a material which may reduce a stress remaining in a waveguide while down-sizing a PLC device and an optical component or the like which is provided therewith.

When a core of an optical waveguide is doped with $ZrO_2$ as a dopant, a relative refractive index difference of the core and the cladding of the optical waveguide may be increased in comparison to a conventional optical waveguide whose core is doped with $GeO_2$. Hereby, an allowable minimum bending radius of the core decreases, and thus, down-sizing, cost-reduction, and high density integration of the PLC component or the like which is provided with the optical waveguide may be expected.

However, since confinement of light into the core increases as the relative refractive index difference of the core and the cladding of the optical waveguide increases, a size of the core for achieving a single-mode propagation decreases, and accordingly a beam diameter of the light propagated in the core decreases. Hereby a connection loss may increase between an optical device including the optical waveguide and an optical fiber inputting and outputting light from/to the optical device.

One factor of occurrence of the connection loss between the optical device and the optical fiber may be a pitch shift of an optical fiber array. For example, when using common single-mode optical fibers, nominal values of a pitch shift in an 8-core fiber array (250 µm pitch) and a pitch shift in a 16-core or 32-core fiber array (127 µm pitch) are ±0.5 µm and ±1.0 µm respectively. However, when connecting an optical fiber array having the range of the pitch shift to an optical device whose relative refractive index difference between a core and a cladding is large, a connection loss may increase significantly. Therefore, there is a need for an optical fiber array whose pitch shift is small and connection loss between the optical fiber array and an optical device is small.

SUMMARY

It is an object of the present disclosure to at least partially solve the problems in the conventional technology.

An optical component according to one aspect of the present disclosure includes: a high-relative-refractive-index-difference optical fiber; a single-mode optical fiber fusion-spliced to the high-relative-refractive-index-difference optical fiber, a mode-field diameter of the single-mode optical fiber being greater than a mode-field diameter of the high-relative-refractive-index-difference optical fiber at a wavelength of 1550 nm; and an optical device connected to an end surface of the high-relative-refractive-index-difference optical fiber where the single-mode optical fiber is not fusion-spliced. A total of a connection loss between the high-relative-refractive-index-difference optical fiber and the single-mode optical fiber at the wavelength of 1550 nm and a connection loss between the high-relative-refractive-index-difference optical fiber and the optical device at the wavelength of 1550 nm is less than a connection loss at the wavelength of 1550 nm when the single-mode optical fiber is connected to the optical device directly.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
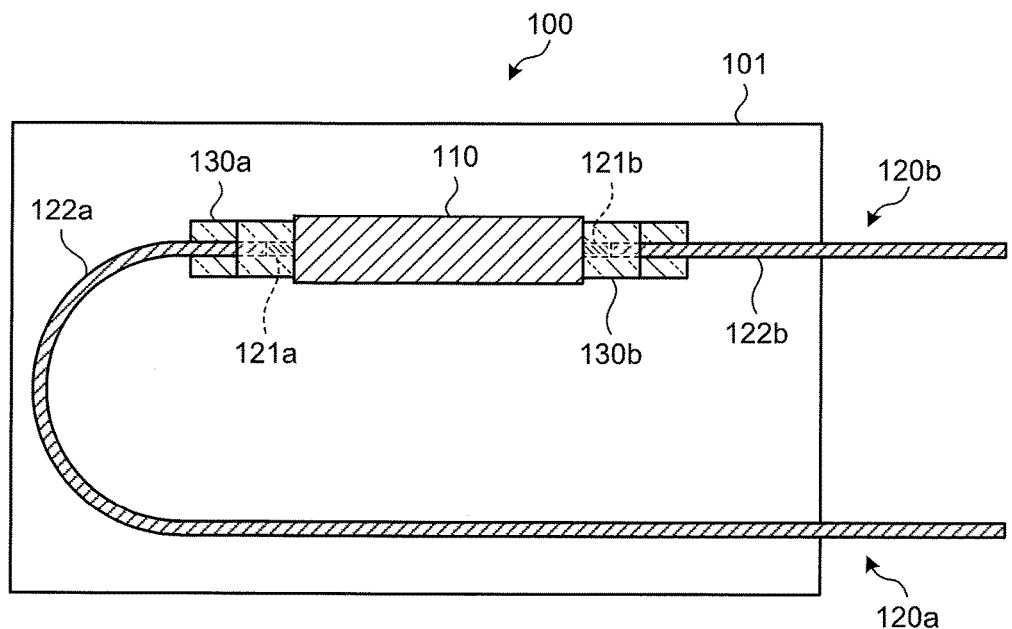
FIG. 1 schematically illustrates a configuration of an optical component according to a first embodiment.

Hereinafter, embodiments of the optical component according to the disclosure will be explained with reference to the drawings. The disclosure is not limited to embodiments explained below. In each drawing, identical or corresponding elements are given same reference numerals appropriately. Moreover, it should be noted that the drawings show schematic examples. Accordingly, a relationship between respective elements may be different from real values. Among the drawings, there may be parts where the relationships and ratios of the illustrated sizes are different from one another. In the description, a cut-off wavelength means a cut-off wavelength according to 22-m method defined by ITU-T (International Telecommunication Union Standardization Sector) G. 650.1. Any terms not specifically defined in the description follow definitions and measuring methods of the ITU-T G. 650.1.

First Embodiment

FIG. 1 illustrates an optical component 100 according to the first embodiment schematically. As illustrated in in FIG. 1, the optical component 100 includes an optical device 110, optical fibers 120a, 120b, fixing members 130a and 130b, and a housing 101. The housing 101 encloses the optical device 110 and the fixing members 130a and 130b, and the optical fibers 120a, 120b are drawn from the housing 101.

The optical device 110 is, for example, a planar lightwave circuit (PLC) device, and has a core which is an area in which light is confined and guided, and a cladding which is formed on an outer circumference of the core and of which refractive index is lower than the core. A relative refractive index difference between the core and the cladding is 2.5% or more and 10% or less. For example, such relative refractive index difference is achieved by doping the core of the PLC device with $ZrO_2$. For sizes of the core, for example, a thickness is 1.5 μm to 6.5 μm and width is 1.5 μm to 6.5 μm. Such optical device 110 has a spot size of, for example, 1.0 μm to 6.5 μm at a wavelength of 1550 nm.

The spot size herein is a diameter of a point where an intensity of a near-field pattern (NFP) of light propagating in a waveguide or a core of an optical fiber becomes the maximum of 5%. When the spot is an ellipse, the spot size varies in a major axis and a minor axis respectively.

The optical device 110 is a coherent mixer used in, for example, a Mach-Zehnder interferometer (MZI), an arrayed-waveguide grating (AWG), and moreover a demodulator based on a coherent modulation method such as dual polarization quadrature phase shift keying (DP-QPSK) method and the like.

The optical fibers 120a, 120b are configured by fusion-splicing optical fibers 121a, 121b (hereinafter called the high Δ optical fibers) of which relative refractive index differences between cores and claddings are large with common single-mode optical fibers 122a, 122b. In the high Δ optical fibers 121a, 121b, the relative refractive index differences of the cores relative to the claddings are 2.0% or more and 3.0% or less, and mode-field diameters at 1550 nm are, for example, 3.0 μm or more and 5.0 μm or less. The common single-mode optical fibers 122a, 122b are optical fibers which conform to the ITU-T G.652 and have zero-dispersion wavelengths at a 1.3 μm band. In common single-mode optical fibers, relative refractive index differences of cores relative to claddings are about 0.3%, and mode-field diameters at 1550 nm are 10 to 11 μm.

The relative refractive index difference is a value defined below:

$$\Delta = \{(n_{c1} - n_c)/n_{c1}\} \times 100$$

where $n_{c1}$ is a maximum refractive index of the core and $n_c$ is a refractive index of the cladding.

The high Δ optical fibers 121a, 121b are fusion-spliced with the single-mode optical fibers 122a, 122b such that a gap of the mode-field diameters at connection points is smoothed to maintain a low connection loss by figuring out a heating condition when performing a fusion-splicing. It is preferable to decrease connection losses between the high Δ optical fibers 121a, 121b and the single-mode optical fibers 122a, 122b to 0.1 dB or less.

The optical fibers 120a, 120b are for inputting light into the optical device 110 and outputting light from the optical device 110. Ends of the optical fibers 120a, 120b at sides of the high Δ optical fibers 121a, 121b are coupled with the optical device 110 optically, and ends of the optical fibers 120a, 120b at sides of the single-mode optical fibers 122a, 122b are introduced to outside of the optical component 100. It is preferable that end surfaces of the high Δ optical fibers 121a, 121b at sides of the optical device 110 be formed obliquely at an angle of 0 degree or more and 16 degrees or less relative to a plane that is vertical to optical axes of the high Δ optical fibers 121a, 121b to suppress reflections of light at the end surfaces. The high Δ optical fibers 121a, 121b and the single-mode optical fibers 122a, 122b may be polarization-maintaining optical fibers which propagate light while maintaining polarization planes.

The fixing members 130a and 130b are members for fixing the high Δ optical fibers 121a, 121b such that the cores of the high Δ optical fibers 121a, 121b are aligned with a core of the optical device 110 in position and such that the optical device 110 is coupled with the high Δ optical fibers 121a, 121b optically. The fixing members 130a and 130b are glass blocks made of a silica-based glass as a material, and a material of which physical properties are close to those of the optical device 110 is adopted in order to prevent an unnecessary stress from being applied to the optical device 110.

Figure 2:
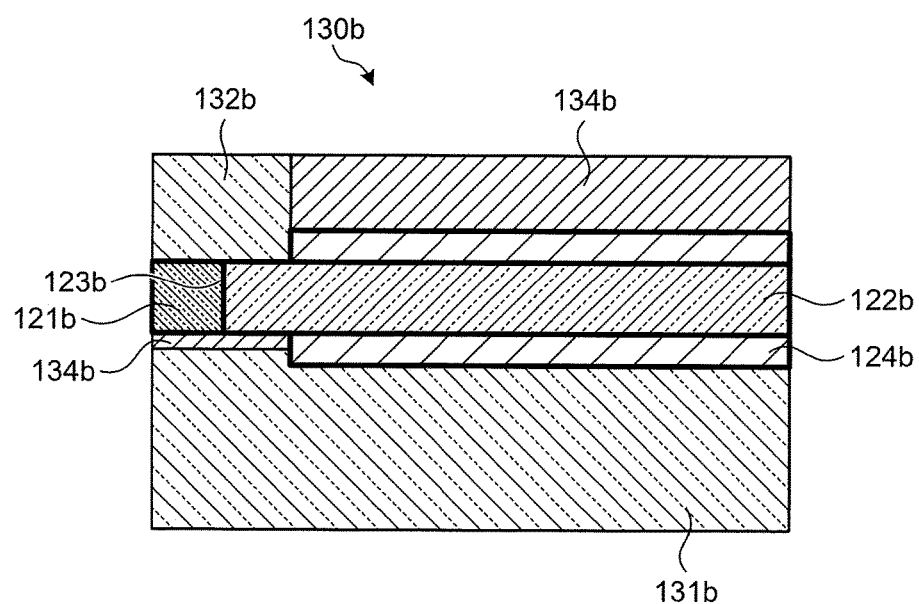
FIG. 2 is a cross-sectional view of a fixing member in a vertical direction including optical axes of a high Δ optical fiber and a single-mode optical fiber.
Figure 3:
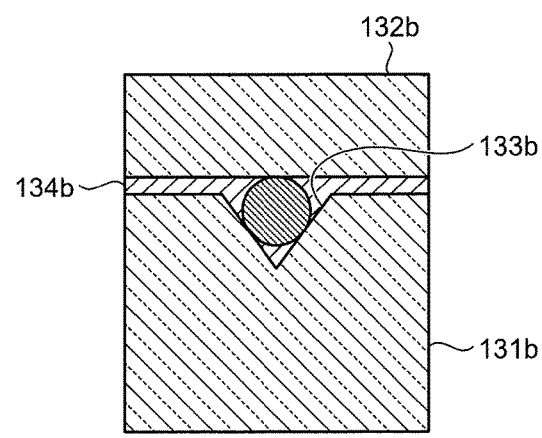
FIG. 3 is a view of a connection surface of a fixing member viewed from an optical device.

FIGS. 2 and 3 are which illustrate arrangements of the high Δ optical fiber 121b and the single-mode optical fiber 122b relative to the fixing member 130b. FIG. 2 is a cross-sectional view of the fixing member 130b in the vertical direction including optical axes of the high Δ optical fiber 121b and the single-mode optical fiber 122b, and FIG. 3 is a view of a connection surface of the fixing member 130b viewed from the optical device 110. Since the fixing member 130a is configured similarly to the fixing member 130b, herein the fixing member 130b is taken up as a representative example.

As illustrated in FIGS. 2 and 3, the fixing member 130b includes a main body portion 131b and an upper plate 132b. A V-shaped groove 133b is provided to the main body portion 131b, and the high Δ optical fiber 121b arranged on the V-shaped groove 133b is sandwiched between the V-shaped groove 133b and the upper plate 132b.

As illustrated in FIG. 2, a fused point 123b of the high Δ optical fiber 121b and the single-mode optical fiber 122b is positioned to be included within the V-shaped groove 133b. In other words, the fused point 123b is sandwiched between the V-shaped groove 133b and the upper plate 132b. Coatings of the high Δ optical fiber 121b and the single-mode optical fiber 122b in an area sandwiched between the V-shaped groove 133b and the upper plate 132b are removed, and in this state, glass portions of the high Δ optical fiber 121b and the single-mode optical fiber 122b in the area are sandwiched directly.

A gap among the high Δ optical fiber 121b, the single-mode optical fiber 122b, the V-shaped groove 133b, and the upper plate 132b is filled with an adhesive 134b. Moreover, the single-mode optical fiber 122b in an area not sandwiched between the V-shaped groove 133b and the upper plate 132b is fixed by the adhesive 134b from above a coating 124b against the main body portion 131b.

In the above-described configuration, an outer diameter of the fused point 123b is preferable to be configured smaller than outer diameters of the high Δ optical fiber 121b and the single-mode optical fiber 122b disposed upstream and downstream thereto. As described above, since the fused point 123b is sandwiched between the V-shaped groove 133b and the upper plate 132b, the fused point 123b may receive a stress from the V-shaped groove 133b and the upper plate 132b possibly. If the fused point 123b receives a stress, a connection loss at the fused point 123b will be worsened. To address this, by machining such that the outer diameter of the fused point 123b is smaller than the outer diameters of the high Δ optical fiber 121b and the single-mode optical fiber 122b disposed upstream and downstream thereto, a stress which the fused point 123b receives from the V-shaped groove 133b and the upper plate 132b is alleviated.

If the fused point 123b contacts the upper plate 132b, a mechanical reliability may be lost possibly. By configuring the outer diameter of the fused point 123b to be smaller than the outer diameters of the high Δ optical fiber 121b and the single-mode optical fiber 122b disposed upstream and downstream thereto, this possibility of losing the mechanical reliability may be reduced.

For a method of controlling the outer diameter of the fused point 123b, a method of controlling amounts by which the high Δ optical fiber 121b and the single-mode optical fiber 122b are pushed to or pulled from each other when fusion-splicing both optical fibers, or a method of etching a fused point the fusion-spliced optical fibers may be used.

Since the optical component 100 configured as described above is sandwiched between the V-shaped groove 133b and the upper plate 132b in a state in which the outer diameter at the fused point 123b of the high Δ optical fiber 121b and the single-mode optical fiber 122b is formed to be smaller than the outer diameters of the optical fibers upstream and downstream to the fused point 123b, the stress which the fused point 123b receives from the V-shaped groove 133b and the upper plate 132b may be alleviated.

Second Embodiment

Figure 4:
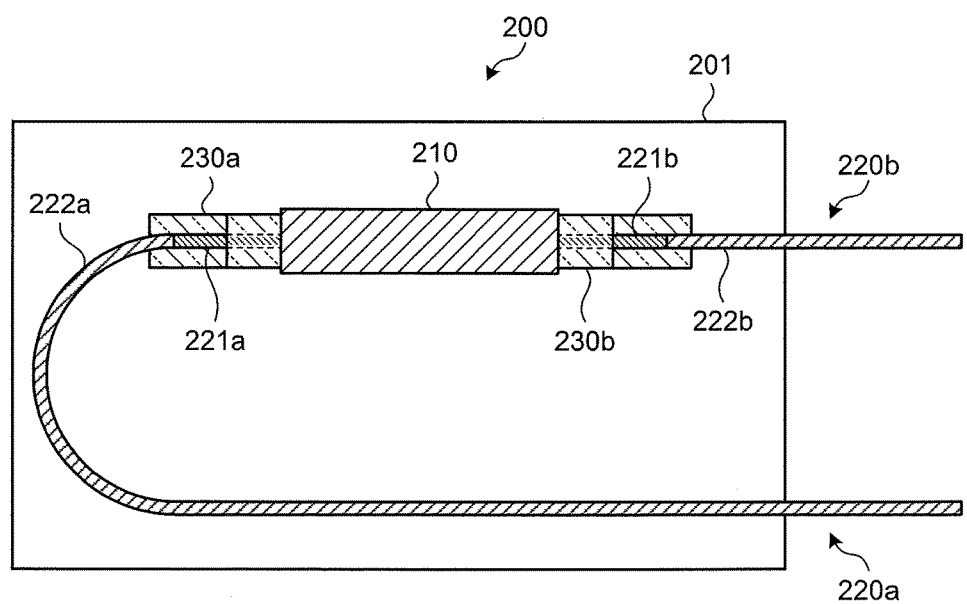
FIG. 4 schematically illustrates a configuration of an optical component according to a second embodiment.

FIG. 4 illustrates a configuration of an optical component 200 according to the second embodiment schematically. As illustrated in FIG. 4, the optical component 200 includes an optical device 210, optical fibers 220a, 220b, fixing members 230a, 230b, and a housing 201. The housing 201 encloses the optical device 210 and the fixing members 230a, 230b, and the optical fibers 220a, 220b are drawn from the housing 201.

Similarly to the first embodiment, an optical waveguide of which relative refractive index difference is great between a core and a cladding is formed in the optical device 210. For example, the optical device 210 is configured such that the relative refractive index difference between the core and the cladding is 2.5% or more and 10% or less by doping a core of a PLC device with $ZrO_2$.

The optical fibers 220a, 220b are configured in which high Δ optical fibers 221a, 221b and single-mode optical fibers 222a, 222b are fused such that a gap of the mode-field diameter at a connection point is smoothed to maintain a low connection loss similarly to the first embodiment. In the high Δ optical fibers 221a, 221b, relative refractive index differences of the cores relative to the claddings are 2.0% or more and 3.0% or less. It is preferable to decrease the connection losses between the high Δ optical fibers 221a, 221b and the single-mode optical fibers 222a, 222b to 0.1 dB or less.

The optical fibers 220a, 220b are for inputting light into the optical device 210 and outputting light from the optical device 210. Ends of the optical fibers 220a, 220b at sides of the high Δ optical fibers 221a, 221b are coupled with the optical device 210 optically, and ends of the optical fibers 220a, 220b at sides of the single-mode optical fibers 222a, 222b are introduced to outside of the optical component 200. It is preferable that end surfaces of the high Δ optical fibers 221a, 221b at sides of the optical device 210 be formed obliquely at an angle of 0 degree or more and 16 degrees or less relative to a plane that is vertical to optical axes of the high Δ optical fibers 221a, 221b to suppress reflections of light at the end surfaces. The high Δ optical fibers 221a, 221b and the single-mode optical fibers 222a, 222b may be polarization-maintaining optical fibers which propagate light while maintaining polarization planes.

The fixing members 230a, 230b are members made of a silica-based glass as a material for fixing the high Δ optical fibers 221a, 221b such that the cores of the high Δ optical fibers 221a, 221b are aligned with a core of the optical device 210 in position and the optical device 210 is coupled optically with the high Δ optical fibers 221a, 221b.

Figure 5:
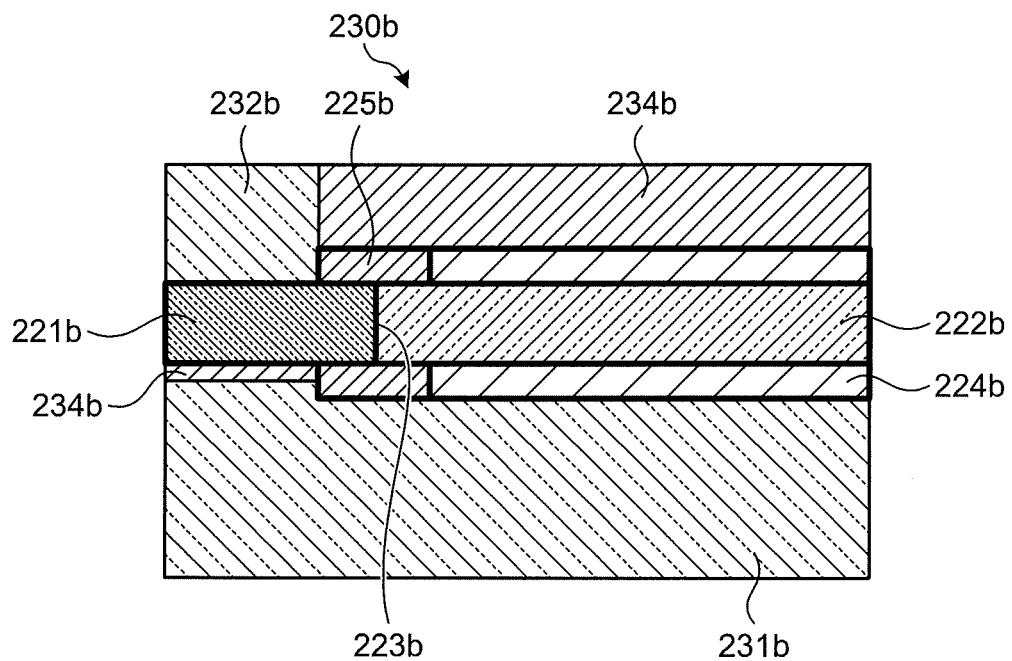
FIG. 5 is a cross-sectional view of a fixing member in a vertical direction including optical axes of a high Δ optical fiber and a single-mode optical fiber.
Figure 6:
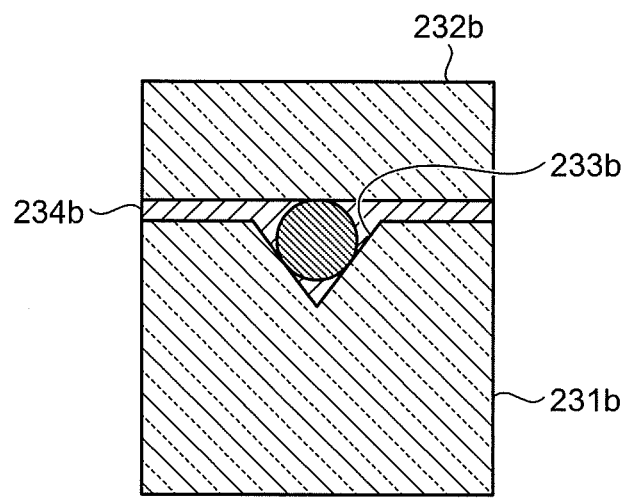
FIG. 6 is a view of a connection surface of a fixing member viewed from an optical device.

FIGS. 5 and 6 are which illustrate arrangements of the high Δ optical fiber 221b and the single-mode optical fiber 222b relative to the fixing member 230b. FIG. 5 is a cross-sectional view of the fixing member 230b in the vertical direction including optical axes of the high Δ optical fiber 221b and the single-mode optical fiber 222b, and FIG. 6 is a view of a connection surface of the fixing member 230b viewed from the optical device 210. Since the fixing member 230a is configured similarly to the fixing member 230b, herein the fixing member 230b is taken up as a representative example.

As illustrated in FIGS. 5 and 6, the fixing member 230b includes a main body portion 231b and an upper plate 232b. A V-shaped groove 233b is provided to the main body portion 231b, and the high Δ optical fiber 221b arranged on the V-shaped groove 233b is sandwiched between the V-shaped groove 233b and the upper plate 232b.

As illustrated in FIG. 5, a fused point 223b of the high Δ optical fiber 221b and the single-mode optical fiber 222b is positioned not to be included within the V-shaped groove 233b. That is, only the high Δ optical fiber 221b exists in an area sandwiched between the V-shaped groove 233b and the upper plate 232b. Therefore, the fused point 223b never receives a stress from the V-shaped groove 233b and the upper plate 232b.

On the other hand, as illustrated in FIG. 5, a so-called recoating is performed to the fused point 223b. When fusion-splicing the high Δ optical fiber 221b to the single-mode optical fiber 222b, a coating 224b near the fused point 223b is supposed to be removed. Recoating indicates applying a coating 225b near the fused point 223b after performing the fusion-splicing. A diameter of the coating 225b is almost the same as a diameter of a coating of the single-mode optical fiber 222b.

A gap among the high Δ optical fiber 221b, the V-shaped groove 233b, and the upper plate 232b is filled with an adhesive 234b. Moreover, the high Δ optical fiber 221b and the single-mode optical fiber 222b in an area not sandwiched between the V-shaped groove 233b and the upper plate 232b are fixed by the adhesive 234b from above coatings 224b, 225b against the main body portion 231b.

Since the fused point 223b of the high Δ optical fiber 221b and the single-mode optical fiber 222b in a state in which a coating having an substantially the same diameter as a coating of the single-mode optical fiber 222b is performed is fixed to the fixing member 230b, the above-described optical component 200 may be handled as a one optical fiber substantially. Therefore, a separate component such as, for example, a reinforcing sleeve for handling the fused point 223b is not necessary.

Third Embodiment

Figure 7:
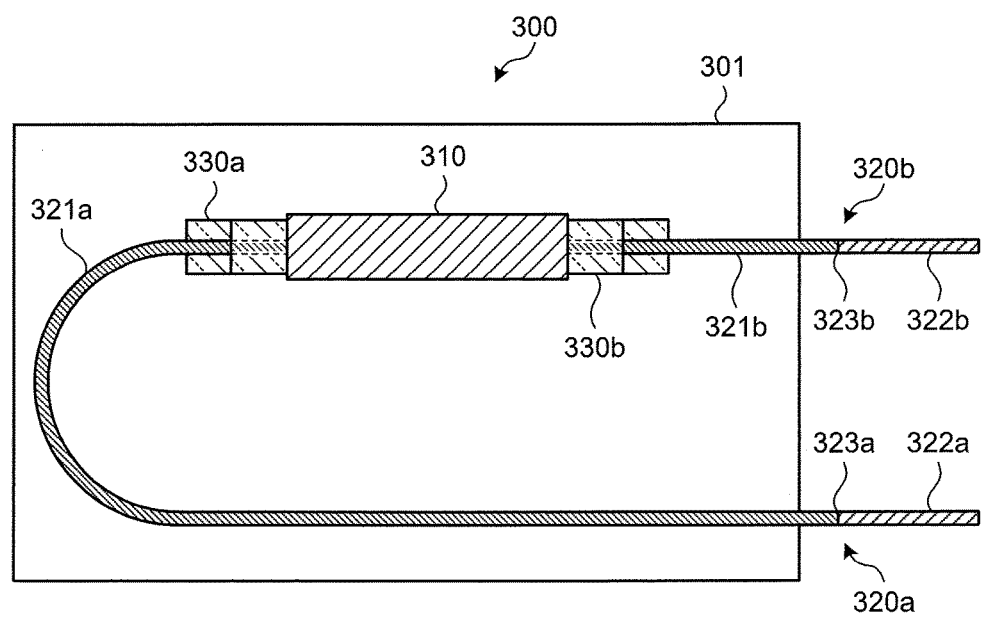
FIG. 7 schematically illustrates a configuration of an optical component according to a third embodiment.

FIG. 7 illustrates a configuration of an optical component 300 according to the third embodiment schematically. As illustrated in FIG. 7, the optical component 300 includes an optical device 310, optical fibers 320a, 320b, fixing members 330a, 330b, and a housing 301. The housing 301 encloses the optical device 310 and the fixing members 330a, 330b, and the optical fibers 320a, 320b are drawn from the housing 301.

Similarly to the first embodiment, an optical waveguide of which relative refractive index difference is great between a core and a cladding is formed in the optical device 310. For example, the optical device 310 is configured such that the relative refractive index difference between the core and the cladding is 2.5% or more and 10% or less by doping a core of a PLC device with $ZrO_2$.

The optical fibers 320a, 320b are configured in which high Δ optical fibers 321a, 321b and single-mode optical fibers 322a, 322b are fused such that a gap of the mode-field diameters at a connection point is smoothed to maintain a low connection loss similarly to the first embodiment. In the high Δ optical fibers 321a, 321b, relative refractive index differences of the cores relative to the claddings are 2.0% or more and 3.0% or less. It is preferable to decrease the connection losses between the high Δ optical fibers 321a, 321b and the single-mode optical fibers 322a, 322b to 0.1 dB or less.

The optical fibers 320a, 320b are for inputting light into the optical device 310 and outputting light from the optical device 310. Of the optical fibers 320a, 320b, ends at sides of the high Δ optical fibers 321a, 321b are coupled with the optical device 310 optically, and ends at sides of the single-mode optical fibers 322a, 322b are introduced to an outside of the optical component 300. It is preferable that end surfaces of the high Δ optical fibers 321a, 321b at sides of the optical device 310 be formed obliquely at an angle of 0 degree or more and 16 degrees relative to a plane that is vertical to optical axes of the high Δ optical fibers 321a, 321b to suppress reflections of light at the end surfaces. The high Δ optical fibers 321a, 321b and the single-mode optical fibers 322a, 322b may be polarization-maintaining optical fibers which propagate light while maintaining polarization planes.

The fixing members 330a, 330b are members made of a silica-based glass as a material for fixing the high Δ optical fibers 321a, 321b to the optical device 310 and coupling the optical device 310 with the high Δ optical fibers 321a, 321b optically.

As illustrated in FIG. 7, fused points 323a, 323b at which the high Δ optical fibers 321a, 321b are fused to the single-mode optical fibers 322a, 322b are arranged at outsides of the housing 301 of the optical component 300. After the fusion-splicing, coatings are applied to the fused points 323a, 323b, and diameters of the coatings are almost the same as diameters of coatings of the single-mode optical fibers 322a, 322b.

In the configuration as well, the high Δ optical fibers 321a, 321b and the single-mode optical fibers 322a, 322b may be handled as one optical fiber substantially. Therefore, a separate component such as a reinforcing sleeve for handling the fused points 323a, 323b is not necessary.

Since, bending losses of the high Δ optical fibers 321a, 321b are low in comparison to the single-mode optical fibers 322a, 322b, by enclosing only the high Δ optical fibers 321a, 321b in the housing 301 of the optical component 300, a bending radius which the optical fiber may tolerate in the housing 301 decreases, and thus it is effective to downsize the optical component 300.

In addition, by using the high Δ optical fibers 321a, 321b of which cladding diameters are smaller than a standard cladding diameter of 125 μm (for example, 50 μm or more and 125 μm or less, or preferably 80 μm or less), volumes of the high Δ optical fibers 321a, 321b themselves decrease and bending stresses applied to the high Δ optical fibers 321a, 321b decrease, thus, mechanical strength and reliability increase. Since the bending radius which the optical fiber may tolerate in the housing 301 may be decreased by this, and thus it is effective to downsize the optical component 300.

Since the fused points 323a, 323b at which the high Δ optical fibers 321a, 321b are fused to the single-mode optical fibers 322a, 322b are arranged at outsides of the housing 301, the optical component 300 configured as described above is effective to downsize the optical component 300. Although, in the embodiment, the fused points 323a, 323b are arranged at outsides of the housing 301, a similar effect may be obtained by arranging the fused points 323a, 323b at positions close to an insertion port of the housing 301 for the optical fibers even if the fused points 323a, 323b are arranged within the housing 301.

Fourth Embodiment

Figure 8:
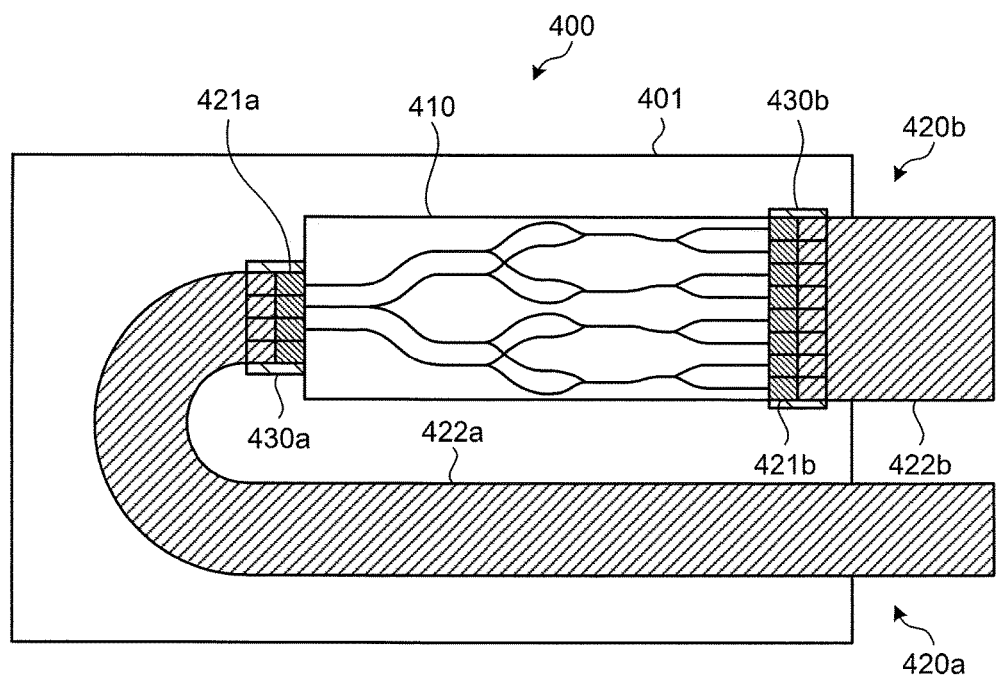
FIG. 8 schematically illustrates a configuration of an optical component according to a fourth embodiment.

FIG. 8 illustrates a configuration of an optical component 400 according to the fourth embodiment schematically. As illustrated in FIG. 8, the optical component 400 includes an optical device 410, arrayed optical fibers 420a, 420b, fixing members 430a, 430b, and a housing 401. The housing 401 encloses the optical device 410 and the fixing members 430a, 430b, and the arrayed optical fibers 420a, 420b are drawn from the housing 401.

The optical device 410 is a PLC device which functions as a coherent mixer used for coherent modulation based on the DP-QPSK method. In an optical waveguide formed in the PLC device, a relative refractive index difference between a core and a cladding is 2.5% or more and 10% or less. For example, such relative refractive index difference is achieved by doping the core of the PLC device with $ZrO_2$.

The arrayed optical fibers 420a, 420b are so-called optical fiber tape core wires in which a plurality of optical fibers are arranged in an array and coated altogether. In the arrayed optical fibers 420a, 420b, each optical fiber is configured in which high Δ optical fibers 421a, 421b and single-mode optical fibers 422a, 422b are fused such that a gap of the mode-field diameters at a connection point is smoothed to maintain a low connection loss similarly to the first embodiment. Although the number of the optical fibers which form the arrayed optical fibers 420a, 420b may depend on a type of the optical device 410, it is preferable that the number of the optical fibers be, for example, eight or more. For example, a cladding diameter of each of the arrayed optical fibers 420a, 420b is 50 μm or more and 125 μm or less, and when the cladding diameter is 50 μm, an interval for the array is 52 μm, and when the cladding diameter is 125 μm, the interval for the array is 127 μm.

In addition, a relative refractive index difference of a core relative to a cladding of each of the high Δ optical fibers 421a, 421b is 2.0% or more and 3.0% or less. It is preferable that connection losses between the high Δ optical fibers 421a, 421b and the single-mode optical fibers 422a, 422b be 0.1 dB or less.

The arrayed optical fibers 420a, 420b are for inputting light into the optical device 410 and outputting light from the optical device 410. Of the arrayed optical fibers 420a, 420b, ends at sides of the high Δ optical fibers 421a, 421b are coupled with the optical device 410 optically, and ends at sides of the single-mode optical fibers 422a, 422b are introduced to an outside of the optical component 400. It is preferable that end surfaces of the high Δ optical fibers 421a, 421b at sides of the optical device 410 be formed obliquely at an angle of 0 degree or more and 16 degrees or less relative to a plane that is vertical to optical axes of the high Δ optical fibers 421a, 421b to suppress reflections of light at the end surfaces. The high Δ optical fibers 421a, 421b and the single-mode optical fibers 422a, 422b are polarization-maintaining optical fibers which propagate light while maintaining polarization planes.

The fixing members 430a, 430b are members made of a silica-based glass as a material for fixing the high Δ optical fibers 421a, 421b to the optical device 410 and coupling the optical device 410 with the high Δ optical fibers 421a, 421b optically. For a method of fixing the high Δ optical fibers 421a, 421b to the fixing members 430a, 430b, any one of the methods according to the above-described first to third embodiments may be adopted.

Figure 9:
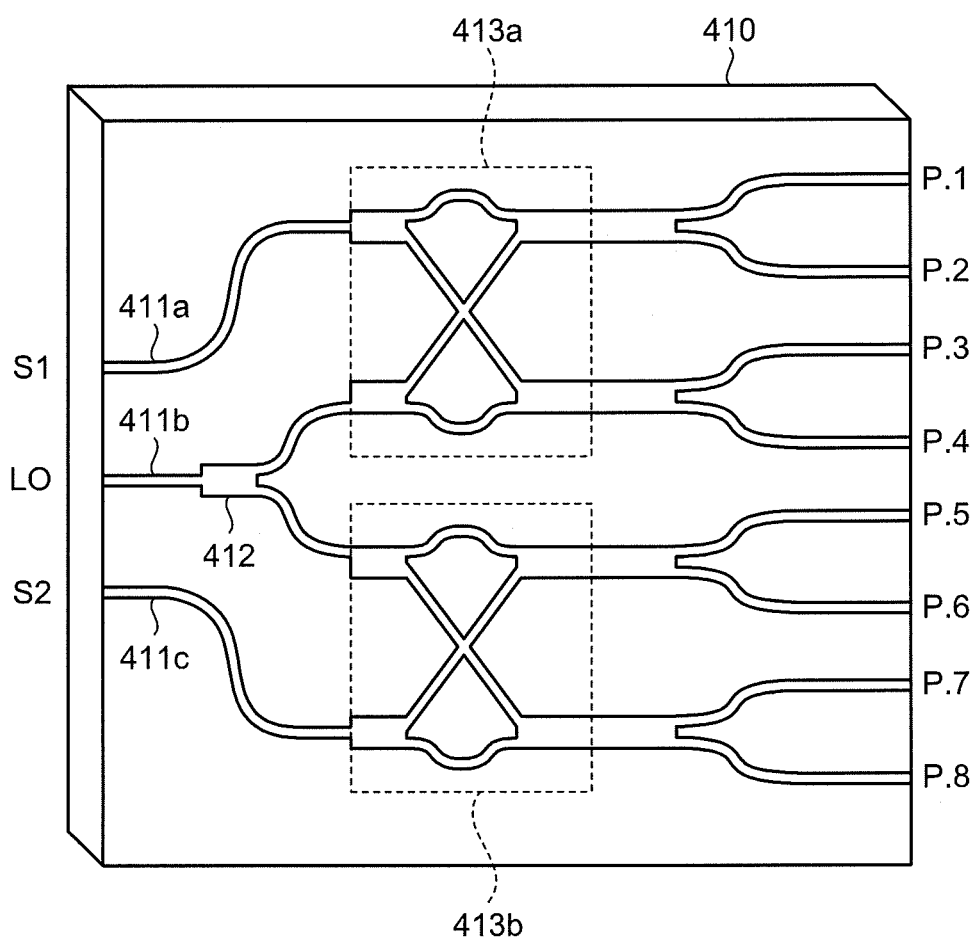
FIG. 9 is a schematic view of a circuit of an optical device functioning as a coherent mixer used for coherent modulation based on a DP-QPSK method.

FIG. 9 is a schematic view of a circuit of the optical device 410 functioning as a coherent mixer used for coherent modulation based on the DP-QPSK method. The schematic view of a circuit illustrated in FIG. 9 is a mere example of a circuit used in the optical device 410, and the embodiment is not limited to the circuit.

As illustrated in FIG. 9, the optical device 410 includes two signal ports (S1, S2), a local oscillation light port (LO), and eight output ports (P.1 to 8). The two signal ports (S1, S2) and the local oscillation light port (LO) are ports for inputting light from the arrayed optical fiber 420a, and the eight output ports (P.1 to 8) are ports for outputting light to the arrayed optical fiber 420a.

In the optical device 410 illustrated in FIG. 9, two signal lights which were subjected to polarization separation in advance and of which polarization planes were adjusted to TM polarizations are input from the two signal ports (S1, S2) to optical waveguides 411a, 411c respectively. The signal light input to the optical waveguide 411a is guided to a 90-degree hybrid device 413a, and the signal light input to an optical waveguide 411c is guided to a 90-degree hybrid device 413b.

On the other hand, a local oscillation light of the TM polarization is input to an optical waveguide 411b from the local oscillation light port (LO). The local oscillation light input to the optical waveguide 411b is split into two by a power splitter 412, and guided to the 90-degree hybrid devices 413a, 413b respectively.

The signal lights interfere with the local oscillation light in the 90-degree hybrid devices 413a, 413b, and are separated to signal lights of I-channel component and signal lights of Q-channel component, and output light are output from the eight output ports (P.1 to 8).

Since a plurality of the high Δ optical fibers 421a, 421b and the single-mode optical fibers 422a, 422b of which cladding diameters are 50 μm are arranged in an array at an interval of 52 μm, the optical component 400 configured as described above is highly compatible with a PLC device in which waveguides are arranged densely and advantageous in downsizing the entire optical component 400.

Verification of Effect

Hereinafter, connection losses when coupling the optical devices with the optical fibers optically which were used in the above-described embodiments will be verified.

A main reason for causing the connection loss is that, since relative refractive index differences differ between the optical waveguides of the optical device and the single-mode optical fiber, beam diameters (spot sizes or mode-field diameters) of light propagating through both of them differ very much. A connection loss was calculated by simulation when a common single-mode optical fiber of which relative refractive index difference of a core relative to a cladding is 0.3% is coupled directly with a PLC device optically which has a core in 3 μm×3 μm having 5.5% of relative refractive index difference relative to a cladding and is doped with $ZrO_2$. It is assumed that there is no center position shift between both cores.

In the simulation, field shapes at emitting facets of the single-mode optical fiber and the PLC device at a wavelength of 1550 nm were calculated, and connection losses were calculated based on an overlapping of electric field distributions when overlapping the centers thereof. Since the electric field distributions were different between the single-mode optical fiber and the PLC device very much, the connection loss was 4.91 dB/facet. Herein dB/facet is used as a unit indicating a connection loss per connection surface (facet).

Next, a study was performed in which, in order to decrease connection loss, a high Δ optical fiber was manufactured by changing design of an optical fiber such that a relative refractive index difference of a core relative to a cladding is 2.0% or more and 3.0% or less such that an electric field distribution is close to that of the PLC device. TABLE 1 is a list of each parameter of a refractive index profile of the high Δ optical fiber used in the study. In TABLE 1, Fibers 1 to 3 are high Δ optical fibers having W-shaped profiles and Fibers 4 to 6 are high Δ optical fibers having single-peaked profiles. Herein the optical fiber having the W-shaped profile is an optical fiber having a center core and an outer circumference core formed at an outer circumference of the center core and having a refractive index which is lower than a refractive index of a cladding. It is assumed that there is no center position shift between both cores.

TABLE 1

| High Δ Optical Fiber | Δ1 | Δ2 | Ra | α | Core Diameter | MFD | Cut-Off Wavelength |
|---|---|---|---|---|---|---|---|
| Fiber 1 | 2.9 | −1 | 0.37 | 4 | 10.5 | 3.4 | 1243 |
| Fiber 2 | 2.4 | −0.6 | 0.53 | 4 | 8 | 3.7 | 946 |
| Fiber 3 | 2 | −0.55 | 0.55 | 4 | 8 | 4.1 | 892 |
| Fiber 4 | 3 | — | 1 | 4 | 3.1 | 3.6 | 1145 |
| Fiber 5 | 2.5 | — | 1 | 4 | 3.4 | 3.9 | 1146 |
| Fiber 6 | 2 | — | 1 | 4 | 4.4 | 4.4 | 1175 |

In TABLE 1, a reference symbol Δ1 is a relative refractive index difference of a core (or a center core) relative to a cladding, and a reference symbol Δ2 is a relative refractive index difference of an outer circumference core relative to the cladding. A reference symbol Ra is a ratio between an outer diameter of the outer circumference core and a diameter of the center core, a diameter of the center core is a diameter at a border portion between the center core and the outer circumference core. A reference symbol MFD is a mode-field diameter. In addition, a reference symbol α is defined as a parameter relating to a refractive index profile described below.

$$n^2(r) = n_{core}^2 \times \{1 - 2 \times (\Delta/100) \times (r/a)^\alpha\} \quad (0 < r < a)$$

where r indicates a position from the center of the core (or the center core) in a radial direction; n(r) indicates a refractive index at the position r; $n_{core}$ indicates a refractive index of the core (or the center core) at r=0, Δ indicates a relative refractive index difference; and a indicates a radius of the core (or the center core). A reference symbol "^" indicates an exponential.

TABLES 2 to 4 illustrate results of the simulation. TABLE 2 is a list of connection losses between the PLC device having a core of which relative refractive index difference is 3.0% and which has a thickness of 3.5 μm and various kinds of optical fibers, TABLE 3 is a list of connection losses between the PLC device having a core of which relative refractive index difference is 5.5% and which has a thickness of 3.0 μm and various kinds of optical fibers, and TABLE 4 is a list of connection losses between the PLC device having a core of which relative refractive index difference is 10.0% and which has a thickness of 1.5 μm and various kinds of optical fibers. In the simulations in TABLES 2 to 4, the calculations were performed by varying widths of the cores of the PLC devices. The spot sizes of these PLC devices are smaller than heights and widths of the cores by 10% or less, and any one of the spot sizes is 1.0 μm or more and 6.5 μm or less both in a height direction and in a width direction.

TABLE 2

| Waveguide Width W [μm] | Fibers Used | | | | | |
|---|---|---|---|---|---|---|
| | Fiber 1 | Fiber 2 | Fiber 3 | Fiber 4 | Fiber 5 | Fiber 6 |
| 2.7 | 0.04 | 0.16 | 0.26 | 0.03 | 0.06 | 0.22 |
| 3.1 | 0.02 | 0.12 | 0.22 | 0.01 | 0.04 | 0.18 |
| 3.5 | 0.01 | 0.09 | 0.17 | 0.01 | 0.02 | 0.14 |
| 3.9 | 0.01 | 0.06 | 0.14 | 0.03 | 0.01 | 0.11 |
| 4.3 | 0.03 | 0.06 | 0.12 | 0.06 | 0.03 | 0.10 |
| 4.7 | 0.07 | 0.06 | 0.11 | 0.11 | 0.05 | 0.09 |
| 5.1 | 0.12 | 0.08 | 0.12 | 0.17 | 0.09 | 0.10 |
| 5.5 | 0.19 | 0.11 | 0.13 | 0.24 | 0.14 | 0.13 |
| 5.9 | 0.26 | 0.16 | 0.16 | 0.32 | 0.20 | 0.16 |
| 6.3 | 0.34 | 0.21 | 0.20 | 0.41 | 0.27 | 0.20 |

[dB/facet]

TABLE 3

| Waveguide Width W [μm] | Fibers Used | | | | | |
|---|---|---|---|---|---|---|
| | Fiber 1 | Fiber 2 | Fiber 3 | Fiber 4 | Fiber 5 | Fiber 6 |
| 2.6 | 0.38 | 0.75 | 0.98 | 0.27 | 0.49 | 0.89 |
| 3.0 | 0.29 | 0.64 | 0.85 | 0.20 | 0.40 | 0.77 |
| 3.4 | 0.23 | 0.55 | 0.75 | 0.15 | 0.33 | 0.68 |
| 3.8 | 0.19 | 0.47 | 0.65 | 0.13 | 0.28 | 0.58 |
| 4.2 | 0.17 | 0.41 | 0.58 | 0.13 | 0.25 | 0.52 |
| 4.6 | 0.18 | 0.38 | 0.53 | 0.15 | 0.24 | 0.48 |
| 5.0 | 0.21 | 0.37 | 0.50 | 0.19 | 0.25 | 0.45 |
| 5.4 | 0.25 | 0.37 | 0.48 | 0.25 | 0.28 | 0.45 |
| 5.8 | 0.31 | 0.40 | 0.49 | 0.31 | 0.33 | 0.46 |
| 6.2 | 0.38 | 0.43 | 0.51 | 0.39 | 0.38 | 0.48 |

[dB/facet]

TABLE 4

| Waveguide Width W [μm] | Fibers Used | | | | | |
|---|---|---|---|---|---|---|
| | Fiber 1 | Fiber 2 | Fiber 3 | Fiber 4 | Fiber 5 | Fiber 6 |
| 1.5 | 2.04 | 2.73 | 3.08 | 1.77 | 2.24 | 2.93 |
| 2.0 | 1.86 | 2.54 | 2.89 | 1.61 | 2.07 | 2.75 |
| 2.5 | 1.66 | 2.30 | 2.64 | 1.42 | 1.86 | 2.50 |
| 3.0 | 1.48 | 2.09 | 2.41 | 1.27 | 1.67 | 2.28 |
| 3.5 | 1.36 | 1.91 | 2.21 | 1.17 | 1.53 | 2.09 |
| 4.0 | 1.28 | 1.78 | 2.06 | 1.12 | 1.44 | 1.95 |
| 4.5 | 1.25 | 1.70 | 1.95 | 1.11 | 1.39 | 1.85 |
| 5.0 | 1.26 | 1.65 | 1.88 | 1.14 | 1.38 | 1.79 |
| 5.5 | 1.31 | 1.64 | 1.84 | 1.20 | 1.40 | 1.77 |
| 6.0 | 1.38 | 1.66 | 1.84 | 1.29 | 1.45 | 1.77 |

[dB/facet]

As listed in TABLES 2 to 4, by using the high Δ optical fiber of which relative refractive index difference of the core relative to the cladding is 2.0% or more and 3.0% or less with the PLC device which has a core of which relative refractive index difference is 2.5% or more and 10% or less, it is understood that the connection loss may be decreased very much in comparison to the single-mode optical fiber. Moreover, it is understood that the connection loss may be decreased by optimizing the waveguide's width of the PLC device. Specifically, in the above-described verification, the connection loss between the high Δ optical fiber and the PLC device in the above-described verification is 3.08 dB even at maximum, and it is smaller than the connection loss of 4.91 dB when the single-mode optical fiber is connected to the PLC device directly even if the connection loss between the high Δ optical fiber and the single-mode optical fiber is 0.1 dB. Connection losses in other examples in the above-described verification are smaller than the maximum value of 3.08 dB evidently, and even if an increase in loss due to a center position shift of a core, which will be explained later, is taken into consideration, the total connection loss among the PLC device, the high Δ optical fiber, and the single-mode optical fiber may be suppressed to 1 dB or less in many cases.

Next, a relationship between a which is a parameter relating to the refractive index profile and core diameters of various kinds of high Δ optical fibers will be studied.

When manufacturing a high Δ optical fiber of which relative refractive index difference of a core relative to a cladding is 2% to 3%, it is difficult to achieve a refractive index profile in a radial direction having a perfect rectangle shape, and thus, it is generally a refractive index profile in which α is about 3 to 6. Then upper limits and lower limits of core diameters were calculated by simulation which uses cores having refractive index profiles where only α is varied within a range of 3 to 6 and other parameters of the Fibers 1 to 6 are maintained. The upper limit and the lower limit of the core diameter were defined below.

When a core diameter increases, a cut-off wavelength shifts to a longer wavelength side. Since, for the purpose of a single-mode propagation of a signal light, a cut-off wavelength must be shorter than wavelength of 1530 nm to 1625 nm of a communication wavelength band, the upper limit of the core diameter was a core diameter such that the cut-off wavelength is 1500 nm or less. When the core diameter decreases, the MFD decreases. However, when the core diameter decreases by a critical value or more, an effect of confining light in a core decreases, thus MFD becomes larger. Therefore, the lower limit of the core diameter was a core diameter which was smaller than a core diameter at which MFD became minimum and was a core diameter at which MFD was greater than the minimum value by 10%.

Figure 10:
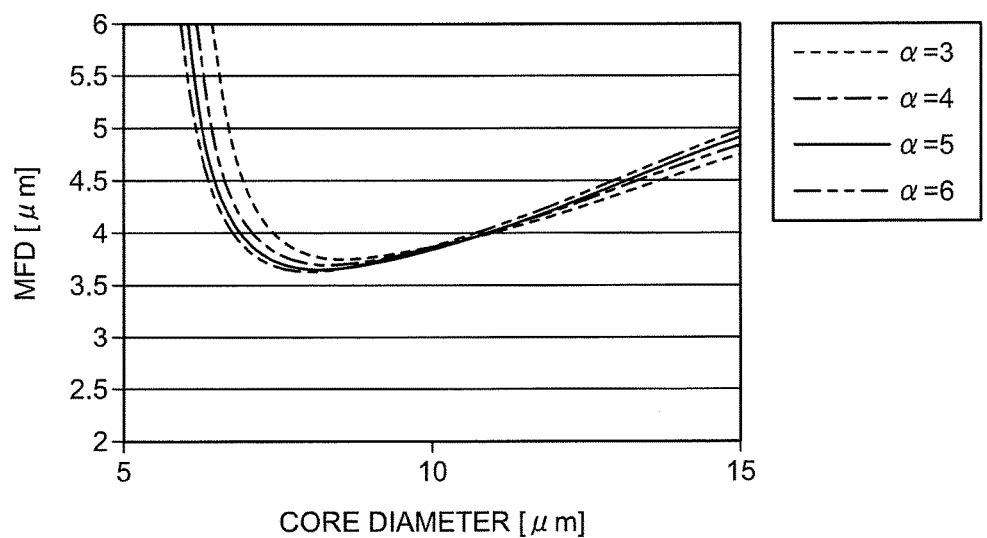
FIG. 10 is a graph which illustrates a relationship between a core diameter and an MFD.
Figure 11:
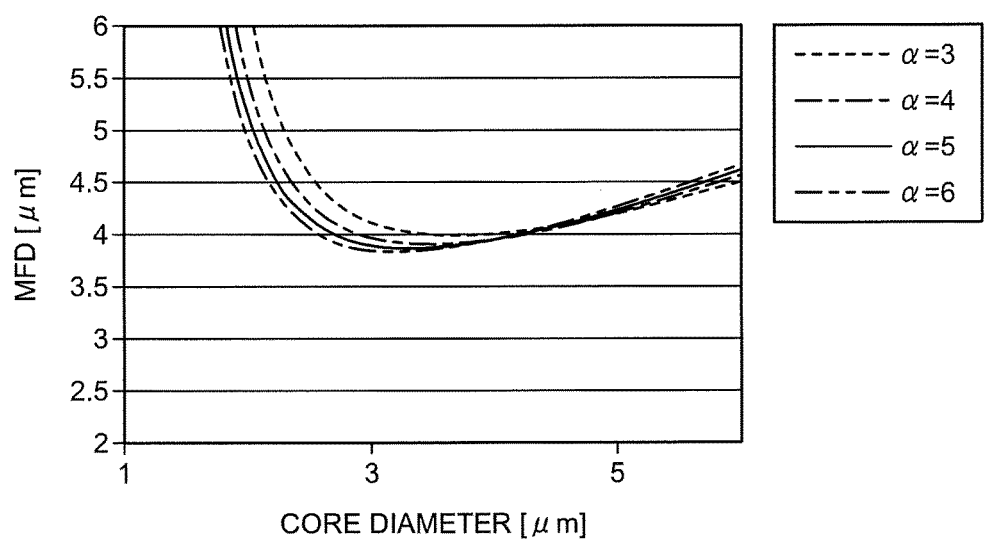
FIG. 11 is a graph which illustrates a relationship between a core diameter and an MFD.
Figure 12:
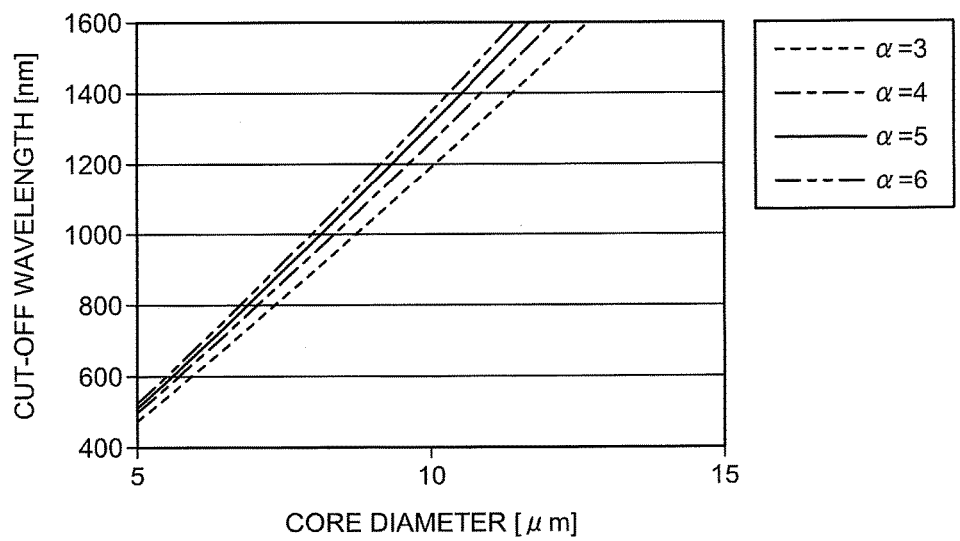
FIG. 12 is a graph which illustrates a relationship between a core diameter and a cut-off wavelength.
Figure 13:
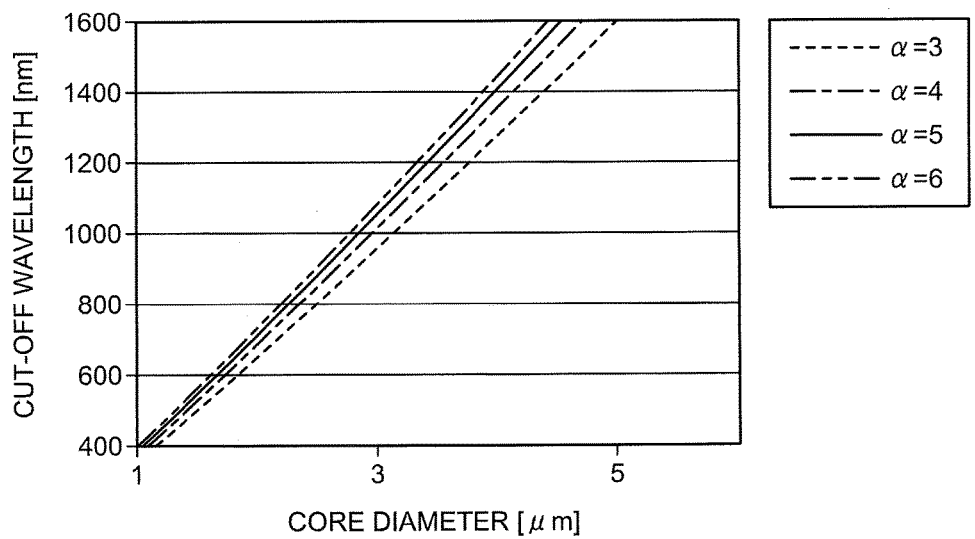
FIG. 13 is a graph which illustrates a relationship between a core diameter and a cut-off wavelength.

TABLE 5 is list of relationship among the upper limit and the lower limit of the core diameter defined above and α. In addition, for Fibers 2 and 5 as representative examples, FIGS. 10 to 13 illustrate relationship between core diameter and MFD and relationship between core diameter and cut-off wavelength. FIG. 10 is a graph which illustrates relationship between core diameter and MFD of the Fiber 2, and FIG. 11 is a graph which illustrates relationship between core diameter and MFD of the Fiber 5. FIG. 12 is a graph which illustrates relationship between core diameter and cut-off wavelength of the Fiber 2, and FIG. 13 is a graph which illustrates relationship between core diameter and cut-off wavelength of the Fiber 5.

TABLE 5

|  | α |  | Core Diameter [μm] | MFD [μm] | Cut-Off Wavelength [nm] |
|---|---|---|---|---|---|
| Fiber 1 | 3 | Upper Limit | 13.3 | 3.8 | 1494 |
|  |  | Lower Limit | 6.5 | 3.6 | 732 |
|  | 4 | Upper Limit | 12.6 | 3.7 | 1499 |
|  |  | Lower Limit | 6.2 | 3.6 | 740 |
|  | 5 | Upper Limit | 12.1 | 3.7 | 1494 |
|  |  | Lower Limit | 6.0 | 3.6 | 743 |
|  | 6 | Upper Limit | 11.8 | 3.7 | 1495 |
|  |  | Lower Limit | 5.9 | 3.5 | 749 |
| Fiber 2 | 3 | Upper Limit | 12.0 | 4.2 | 1492 |
|  |  | Lower Limit | 7.2 | 4.2 | 776 |
|  | 4 | Upper Limit | 11.4 | 4.1 | 1488 |
|  |  | Lower Limit | 7.0 | 4.1 | 792 |
|  | 5 | Upper Limit | 11.1 | 4.1 | 1498 |
|  |  | Lower Limit | 6.8 | 4.1 | 790 |
|  | 6 | Upper Limit | 10.8 | 4.0 | 1488 |
|  |  | Lower Limit | 6.7 | 1.0 | 795 |
| Fiber 3 | 3 | Upper Limit | 12.6 | 4.6 | 1491 |
|  |  | Lower Limit | 7.5 | 4.6 | 774 |
|  | 4 | Upper Limit | 12.0 | 4.5 | 1493 |
|  |  | Lower Limit | 7.3 | 4.5 | 791 |
|  | 5 | Upper Limit | 11.6 | 4.4 | 1489 |
|  |  | Lower Limit | 7.1 | 4.5 | 791 |
|  | 6 | Upper Limit | 11.4 | 4.4 | 1499 |
|  |  | Lower Limit | 7.0 | 4.4 | 797 |
| Fiber 4 | 3 | Upper Limit | 4.2 | 3.7 | 1468 |
|  |  | Lower Limit | 2.4 | 4.0 | 839 |
|  | 4 | Upper Limit | 4.0 | 3.7 | 1484 |
|  |  | Lower Limit | 2.2 | 4.0 | 817 |
|  | 5 | Upper Limit | 3.8 | 3.6 | 1465 |
|  |  | Lower Limit | 2.1 | 4.0 | 811 |
|  | 6 | Upper Limit | 3.7 | 3.6 | 1466 |
|  |  | Lower Limit | 2.0 | 4.1 | 794 |
| Fiber 5 | 3 | Upper Limit | 4.7 | 4.1 | 1500 |
|  |  | Lower Limit | 2.6 | 4.4 | 830 |
|  | 4 | Upper Limit | 4.4 | 4.1 | 1488 |
|  |  | Lower Limit | 2.5 | 4.3 | 846 |

TABLE 5-continued

|  | α |  | Core Diameter [μm] | MFD [μm] | Cut-Off Wavelength [nm] |
|---|---|---|---|---|---|
|  | 5 | Upper Limit | 4.2 | 4.0 | 1477 |
|  |  | Lower Limit | 2.4 | 4.3 | 844 |
|  | 6 | Upper Limit | 4.1 | 4.0 | 1482 |
|  |  | Lower Limit | 2.3 | 4.3 | 832 |
| Fiber 6 | 3 | Upper Limit | 5.2 | 4.6 | 1482 |
|  |  | Lower Limit | 2.9 | 5.0 | 827 |
|  | 4 | Upper Limit | 4.9 | 4.5 | 1481 |
|  |  | Lower Limit | 2.8 | 4.8 | 846 |
|  | 5 | Upper Limit | 4.7 | 4.5 | 1477 |
|  |  | Lower Limit | 2.7 | 4.7 | 848 |
|  | 6 | Upper Limit | 4.6 | 4.5 | 1486 |
|  |  | Lower Limit | 2.6 | 4.8 | 840 |

As illustrated in TABLE 5, the high Δ optical fibers of which relative refractive index differences of cores relative to claddings are 2.0% or more and 3.0% or less suffer fewer mismatching to optical fields of the PLC devices which have cores of which relative refractive index differences are 2.5% or more and 10% or less and of which spot sizes at a wavelength of 1550 nm are 1.0 μm or more and 6.5 μm or less, and thus, the connection losses between the high Δ optical fibers and the optical devices may be suppressed and low.

As described above, when the optical device in which an optical waveguide having the core of which relative refractive index difference is 2.5% or more and 10% or less is formed is coupled optically with the high Δ optical fiber of which relative refractive index difference of the core relative to the cladding is 2.0% or more and 3.0% or less, the connection loss between the optical device and the high Δ optical fiber is low. Moreover, when the high Δ optical fiber is fusion-spliced to the single-mode optical fiber such that a gap of the mode-field diameter at a connection point is smoothed to maintain a low connection loss as described above, the connection loss may be decreased to 0.1 dB or less.

Combination of those described above indicates that, when the optical device which has a core of which relative refractive index difference is 2.5% or more and 10% or less and of which spot size is 1.0 μm or more and 6.5 μm or less is coupled optically with high Δ optical fiber of which relative refractive index difference of the core relative to the cladding is 2.0% or more and 3.0% or less, the connection loss decreases more evidently than coupling optically the common single-mode optical fiber to the optical device directly. Especially when the spot size of the PLC device is 3.0 μm or more and 5.0 μm or less, the connection loss decreases particularly evidently.

To say of the above-described results in other words, in the configuration of the embodiment, a total of the connection loss between the high Δ optical fiber and the single-mode optical fiber at the wavelength of 1550 nm and the connection loss between the high Δ optical fiber and the optical device at the wavelength of 1550 nm is supposed to be lower evidently than the connection loss when the single-mode optical fiber is connected to the optical device directly at the wavelength of 1550 nm.

Fifth Embodiment

Figure 14:
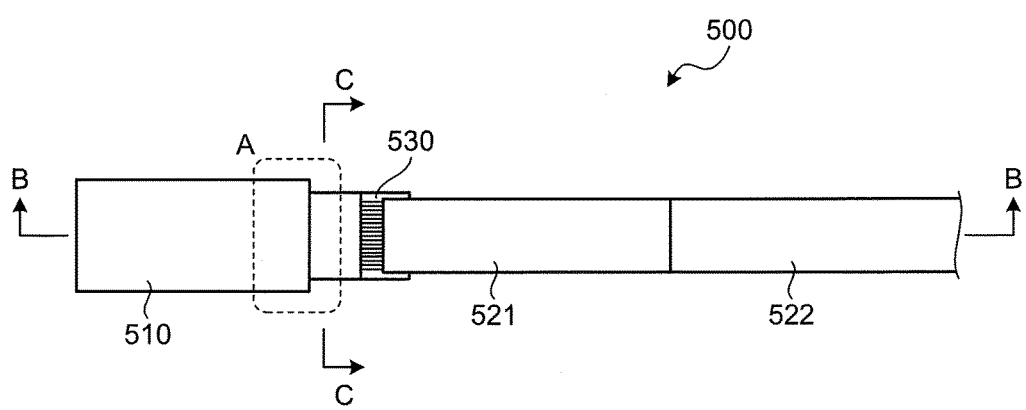
FIG. 14 schematically illustrates a configuration of an optical component according to a fifth embodiment.

Next, an optical component 500 according to the fifth embodiment will be explained. FIG. 14 illustrates a configuration of the optical component 500 according to the fifth embodiment schematically. The optical component 500 has a connection structure in which an optical device 510 having a high relative refractive index difference is connected to a single-mode optical fiber 522 indirectly via a high Δ optical fiber 521.

The optical device 510 having the high relative refractive index difference is, for example, a multicast switch. The optical device 510 having the high relative refractive index difference is a so called ultra-high Δ optical device in which a plurality of cores are provided and of which relative refractive index difference of the core relative to a cladding is 2.5% or more and 10% or less.

For example, such relative refractive index difference is achieved by doping the core with $ZrO_2$. For sizes of the core, for example, a thickness is 1.5 μm to 6.5 μm and a width is 1.5 μm to 6.5 μm.

Such optical device 510 has, for example, 1.0 μm to 6.5 μm of spot size at a wavelength of 1550 nm. The spot size herein is a diameter of a near-field pattern (NFP) where an intensity of the NFP of light propagating through a waveguide or a core of an optical fiber is 5% relative to the maximum intensity of the NFP. When the spot size is in ellipse, the spot size differs in major axis and minor axis respectively.

The high Δ optical fiber 521 is an optical fiber of which relative refractive index difference of a core relative to a cladding is 2.0% or more and 3.0% or less, and a mode-field diameter at 1550 nm is, for example, 3.0 μm or more and 5.0 μm or less. For the refractive index profile, for example, a single-peak type or a W-type may be used. The W-type refractive index profile has a center core and an outer circumference core, and a refractive index of the outer circumference core is lower than a refractive index of a cladding formed at an outer circumference of the center core. Each parameter of each refractive index profile is adjusted such that the mode-field diameter is, for example, 3.0 μm or more and 5.0 μm or less. A plurality of the high Δ optical fibers 521 are formed into tapes and form tape core wires. The respective high Δ optical fibers 521 are fixed to a fixing member 530 at predetermined intervals. That is, the optical device 510 having the high relative refractive index difference is connected to an optical fiber array in which the high Δ optical fibers 521 are fixed to the fixing member 530. The optical fiber array will be explained later in detail.

Tape core wires which are the single-mode optical fibers 522 formed into a tape are connected to the other end of the tape core wires which are the high Δ optical fibers 521 formed into the tape. The high Δ optical fiber 521 and the single-mode optical fiber 522 are fused to each other such that a gap of mode-field diameters is smoothed at a connection point by adjusting a heating condition when performing a fusion-splicing to maintain a low connection loss, for example, the connection loss may be suppressed to about 0.1 dB/facet.

When the optical device 510 having the high relative refractive index difference is connected to the single-mode optical fiber 522 directly by a conventional method, a connection loss may be about 5 dB/facet possibly. In contrast to this, a total of connection losses may be decreased by connecting both of them via the high Δ optical fibers 521 even though connection points increase. For example, if the connection loss between the optical device 510 having the high relative refractive index difference and the high Δ optical fiber 521 may be suppressed to about 0.4 dB/facet, a total of the connection losses including the connection loss between the optical device 510 having the high relative refractive index difference and the single-mode optical fiber 522 may be suppressed to about 0.5 dB. Details of a connection portion of the optical device 510 having the high relative refractive index difference and the high Δ optical fiber 521 will be explained below.

Figure 15:
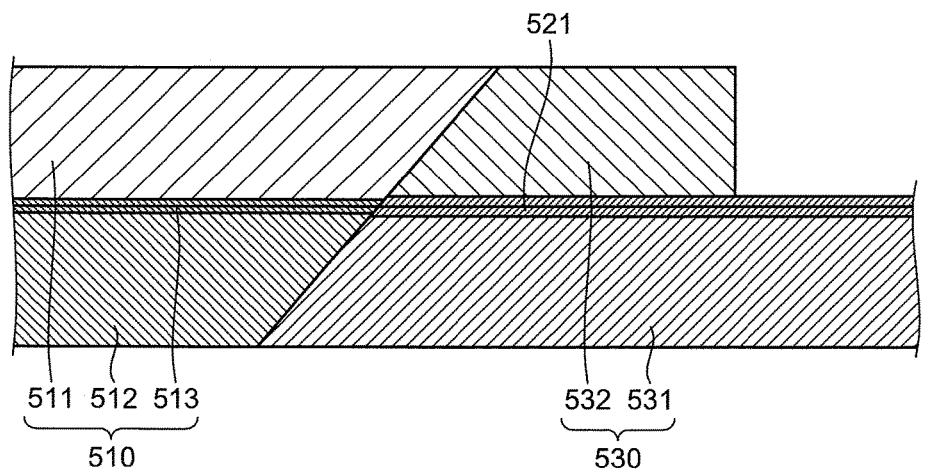
FIG. 15 is a cross-sectional view taken along a line B-B at a section A in FIG. 14.

FIG. 15 is a cross-sectional view taken along a line B-B at a section A of FIG. 14 and is a cross-sectional view of a longitudinal direction of the high Δ optical fiber 521 near a connection portion of the optical device 510 having the high relative refractive index difference and the high Δ optical fiber 521. In the optical device 510 having the high relative refractive index difference, a waveguide 513 (a core and a cladding) is formed between a lid 511 and a substrate 512 which are disposed vertically. The fixing member 530 includes a main body portion 531 and an upper plate 532. The high Δ optical fiber 521 is sandwiched between the main body portion 531 and the upper plate 532. The waveguide 513 is connected with the high Δ optical fiber 521 optically.

A junction interface between the fixing member 530 and the optical device 510 having the high relative refractive index difference is formed obliquely for the purpose of preventing reflection and adhered to each other by an adhesive.

Figure 16A:
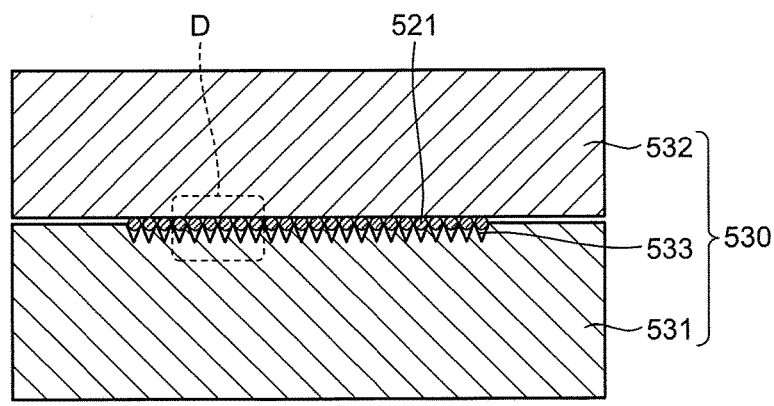
FIG. 16A is a cross-sectional view taken along a line C-C in FIG. 14.

FIG. 16A is a cross-sectional view taken along line C-C in FIG. 14, and is a cross-sectional view of the high Δ optical fiber 521 fixed to the fixing member 530 viewed in a direction which is orthogonal to the longitudinal direction of the high Δ optical fiber 521. V-shaped grooves 533 are formed at predetermined pitches on the main body portion 531 of the fixing member 530, and the high Δ optical fibers 521 are arranged to the V-shaped grooves 533 respectively. That is, the high Δ optical fibers 521 are arrayed at predetermined pitches.

Figure 16B:
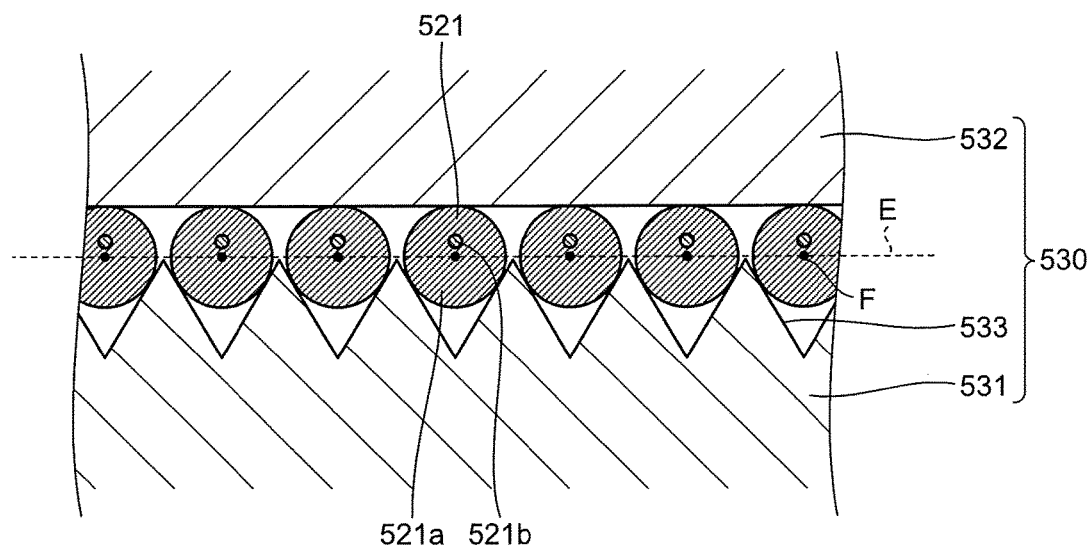
FIG. 16B is an enlarged view of a section D in FIG. 16A

FIG. 16B is an enlarged view of a section D in FIG. 16A. The high Δ optical fiber 521 has a cladding 521a and a core 521b. As described above, a center of the core 521b may be shifted eccentrically relative to a center (indicated as a black circle F in the drawing) of the cladding 521a. In the embodiment, the high Δ optical fibers 521 are arrayed such that eccentricity directions of the cores 521b are constant to one another.

Here the directions which are constant to one another indicate that those directions may not have to be identical perfectly. For example, all of the cores 521b may be arranged in a same direction relative to a center line E passing through centers F of the claddings 521a. In the example illustrated in FIG. 16B, all of the cores 521b are arranged to be shifted eccentrically upward in the drawing relative to the center line E which is parallel with an arrangement direction of the high Δ optical fibers 521. That is, if the cores are aligned to be positioned within a range (180°) of an identical direction relative to the center line E, some shift in angle may exist.

Figure 17:
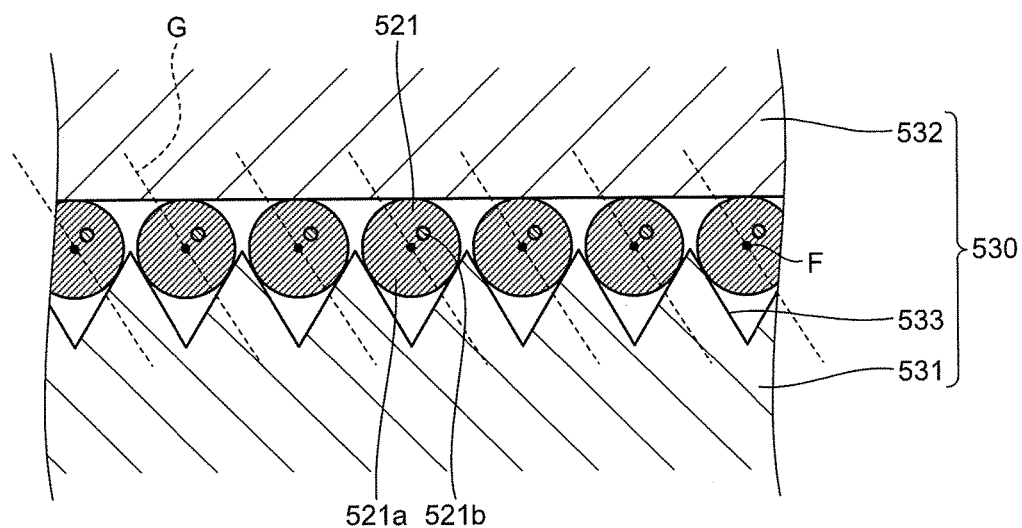
FIG. 17 illustrates other arrangement of the high Δ optical fiber.

The eccentricity direction may not have to be in a direction in which the high Δ optical fibers 521 are arrayed or in a direction which is orthogonal to the direction in which the high Δ optical fibers 521 are arrayed. For example, as illustrated in FIG. 17, when arbitrary center lines G are assumed which pass through the centers F of the respective high Δ optical fibers 521 and are parallel to one another, if the respective eccentricity directions of the cores 521b of the high Δ optical fiber 521 are arranged in constant directions (upper right-hand sides in the drawing) relative to the respective center lines G, the eccentricity directions may be in any direction.

Figure 18:
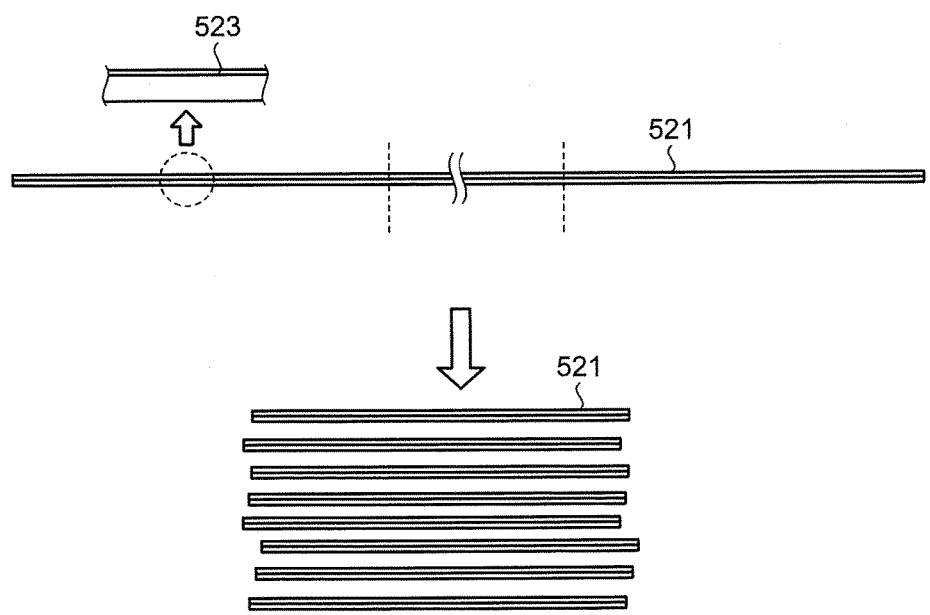
FIG. 18 illustrates a step of cutting the high Δ optical fiber to short high Δ optical fibers.

Hereinafter, a method of connecting the optical device 510 having a high relative refractive index difference to the single-mode optical fiber 522 according to the embodiment will be explained. At first, as illustrated in FIG. 18, a high Δ optical fiber 521 is cut into a plurality of short high Δ optical fibers 521. In advance to this state, a mark 523 formed by coloring and the like is formed linearly, along a longitudinal direction, to a portion of an outer circumference surface of the high Δ optical fiber 521. The number of the short high Δ optical fibers 521 is identical to the number of the cores of optical fibers forming a fiber array. The length of the short high Δ optical fiber 521 is, for example, about 2 to 50 mm.

Figure 19:
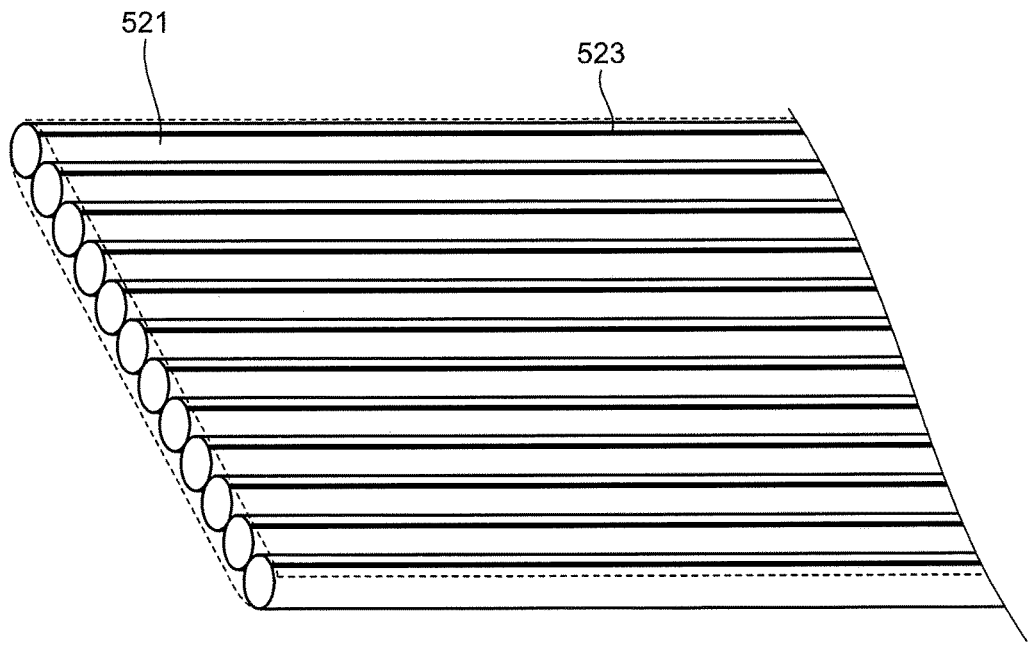
FIG. 19 illustrates a step of arranging the short high Δ optical fibers and forming it to a tape.

Next, as illustrated in FIG. 19, the short high Δ optical fibers 521 which were cut out are arrayed to be formed into a tape. At this time, the high Δ optical fibers 521 are arrayed such that the marks 523 are directed in the substantially same direction. For example, the short high Δ optical fibers 521 are arrayed such that all the marks 523 are visible when viewed from thereabove to form the short high Δ optical fibers 521 into a tape.

Since the mark 523 is formed straight in the longitudinal direction of the high Δ optical fiber 521, all of positional relationships between eccentricity directions of cores and circumference directions of the marks 523 in a cross-section which is orthogonal to the longitudinal direction of the short high Δ optical fiber 521 are substantially constant. Since the short high Δ optical fiber 521 is sufficiently short, a twist or the like may be caused hardly. Therefore, eccentricity directions in an approximate predetermined direction may be aligned easily without checking the eccentricity directions of the cores of the short high Δ optical fiber 521

Figure 20:
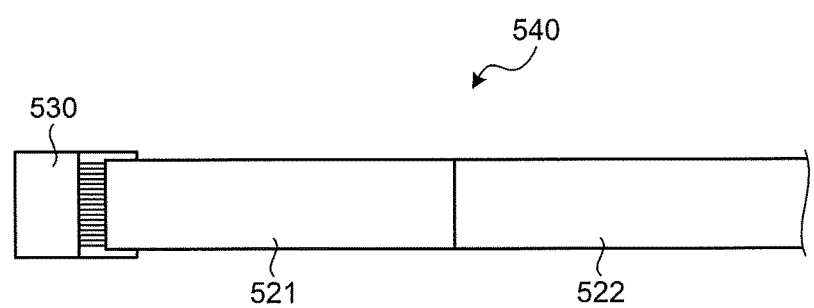
FIG. 20 illustrates an optical fiber array.

Next, as illustrated in FIG. 20, a tape core wire which is formed separately by arraying single-mode optical fibers 522 into a tape is connected to an end of the tape core wire obtained by forming the short high Δ optical fibers 521 into the tape. As described above, when connecting the high Δ optical fibers 521 to the single-mode optical fibers 522, they are fused such that a gap of mode-field diameters at connection points is smoothed and a connection loss is suppressed low.

Next, an end of the tape core wire at a side of the high Δ optical fibers 521 is fixed to the fixing member 530. As explained above, an optical fiber array 540 is formed. By connecting the obtained optical fiber array 540 to the optical device 510 having a high relative refractive index difference, the optical device 510 having a high relative refractive index difference is connected to the single-mode optical fiber 522.

Herein, as a cause of a pitch shift of the optical fiber array, a cutting accuracy of a fixing member forming the optical fiber array, a position shift of optical fibers when assembling them, and a core eccentricity and variation in cladding outer diameters of optical fibers and the like are considered. Especially, factors dominating the pitch shift of the optical fiber array are variations in core eccentricity and cladding outer diameter, and it is known that, in an optical fiber obtained by a common production method, variations of about ±0.3 μm may occur respectively.

When center positions of cores to be connected to each other shift, for example, by 0.3 μm, and a connection of the high Δ optical fiber 521 to an optical device having a high relative refractive index difference is assumed, a connection loss caused by this center position shift (pitch shift) is anticipated to be about 0.7 dB/facet. Therefore, this concentration shift must be suppressed.

In contrast to this, as illustrated in FIGS. 16B and 17, a pitch shift may be reduced by aligning and arraying the respective core eccentricity directions of the high Δ optical fibers 521. However, even if the eccentricity directions of the cores of the respective high Δ optical fibers 521 are aligned, the pitch shift may not be suppressed sufficiently if eccentricity amounts of the respective high Δ optical fibers 521 vary. For example, when a plurality of optical fibers of which eccentricity amounts vary within a range of 0 μm to 0.3 μm are arrayed, and even if their eccentricity directions are aligned with one another, the core center position (pitch) are supposed to shift by 0.3 μm at maximum.

In the disclosure, the plurality of high Δ optical fibers 521 fixed to the fixing member 530 are formed by the short high Δ optical fibers 521 cut out from one piece of optical fiber. For example, even if one piece of high Δ optical fiber is cut into a hundred short high Δ optical fibers each of which is 10 mm in length, necessary short high Δ optical fibers may be obtained from an about 1 m of a high Δ optical fiber.

Usually, a change in core eccentricity amounts and a variation in cladding outer diameters fluctuate modestly relative to the longitudinal direction of the high Δ optical fibers. Therefore, the core eccentricity amounts and the cladding outer diameters hardly fluctuate within a range of about several meters. Specifically, a high Δ optical fiber of which length is about several meters may suppress variation in the core eccentricity amounts and variations in the cladding outer diameters at less than ±0.05 μm. Therefore, variations in the core eccentricity amounts and the cladding outer diameters of the short high Δ optical fibers cut out from a predetermined length of the high Δ optical fiber 521 are very little.

By forming the optical fiber array by using the short high Δ optical fibers obtained in this way and aligning the core eccentricity directions, the pitch shift may be minimized. Therefore, a connection loss caused by the pitch shift between the optical device 510 having a high relative refractive index difference and the optical fiber array 540 (high Δ optical fiber 521) may be decreased to 0.4 dB/facet or less.

As described above, according to the embodiment, since the short high Δ optical fibers 521 cut out from one piece of the high Δ optical fiber 521 are used, variations in core eccentricity amount and cladding outer diameter of the respective short high Δ optical fiber 521 are very little. Since the optical fiber array 540 is formed by aligning the core eccentricity directions of the respective short high Δ optical fibers 521, the pitch shift occurs very little. Therefore, the connection loss between the optical device 510 having a high relative refractive index difference and the optical fiber array 540 may be decreased. Therefore, the optical device 510 having a high relative refractive index difference may be connected to the single-mode optical fiber 522 effectively.

Especially, since the optical device 510 having a high relative refractive index difference and the single-mode optical fiber 522 are connected via the high Δ optical fiber 521, the connection loss may be decreased in total in comparison to the optical device 510 having the high relative refractive index difference connected to the single-mode optical fiber 522 directly.

Since the short high Δ optical fibers 521 are fixed to the fixing member 530, the short high Δ optical fibers 521 may be arrayed at a predetermined pitch reliably.

Although, in the embodiment, a circumference direction of the optical fiber is specified by forming the mark 523 formed linearly by coloring and the like, along a longitudinal direction, to a portion of an outer circumference surface of the high Δ optical fiber 521, a method of specifying the circumference direction of the optical fiber is not limited to this. For example, an outer shape of an optical fiber may be other than a circle (an ellipse, a rectangle, a shape in which a portion of a circle is cut linearly). Alternatively, a marker may be buried in the optical fiber.

Sixth Embodiment

Figure 21:
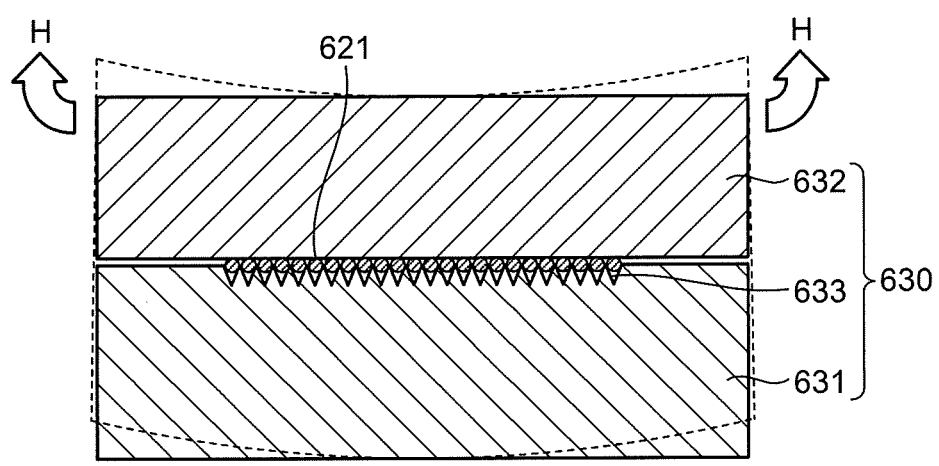
FIG. 21 is a cross-sectional view of a fixing member of an optical component according to a sixth embodiment.

Next, an optical component according to the sixth embodiment will be explained. FIG. 21 is a cross-sectional view of a fixing member 630 for an optical component according to the sixth embodiment. In the explanations below, duplicated explanations will be omitted for a configuration obtaining a function similar to the fifth embodiment.

The fixing member 630 includes a main body portion 631 provided with V-shaped grooves 633, and an upper plate 632. The main body portion 631 and the upper plate 632 are adhered by, for example, an adhesive. In this case, a warp may occur to the fixing member 630 along with a hardening of the adhesive sometimes (H in the drawing). Specifically, both of lateral sides of the fixing member 630 may be deformed upwardly (or downwardly) possibly.

Figure 22A:
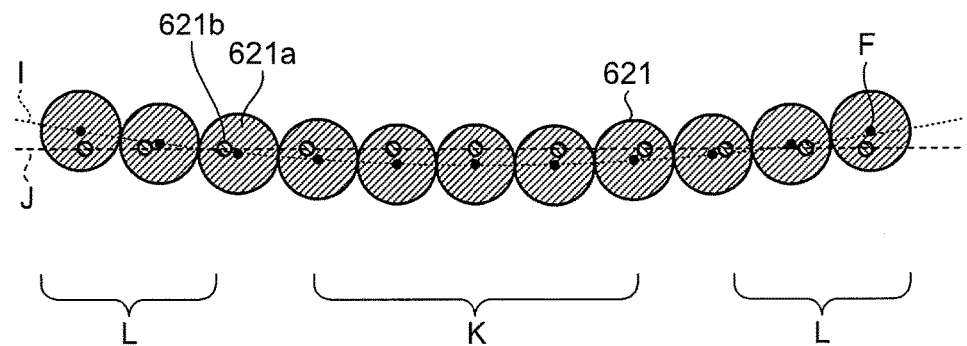
FIG. 22A illustrates other arrangement of the high Δ optical fiber.

FIG. 22A is a conceptual diagram illustrating a state of high Δ optical fibers 621 arrayed when a warp occurs to the fixing member 630 in a cross-section orthogonal to the longitudinal direction of high Δ optical fibers 621. A range K in the drawing indicates the high Δ optical fibers 621 near a center portion relative to an array direction, and a range L in the drawing indicates the high Δ optical fibers 621 near both end portions relative to the array direction.

When a warp occurs to the fixing member 630, a center line I connecting centers F of the respective high Δ optical fibers 621 is shifted from an ideal center line J in an ideal state. Specifically, a center line I is positioned below the ideal center line J in the range K, and the center line I is positioned above the ideal center line J in the range L. That is, a positional relationship between the center line I and the ideal center line J is opposite to each other between the range K and the range L relative to a direction which is orthogonal to the arrangement direction of the high Δ optical fibers 621.

In the embodiment, all of eccentricity directions of cores 621b are not aligned in a predetermined direction but varied in accordance with positions of the high Δ optical fibers 621 which are arranged. For example, the eccentricity directions of the cores 621b of the high Δ optical fibers 621 in center are directed upwardly, the high Δ optical fibers 621 closer to end portion sides are rotated more by a predetermined angle, such that the eccentricity directions of the cores 621b of the high Δ optical fibers 621 at the outermost end portions are directed downwardly. That is, between the center high Δ optical fiber 621 and the high Δ optical fibers 621 at the outermost end portions, the high Δ optical fibers 621 are rotated by 180°.

As explained above, by rotating and arranging such that the eccentricity directions of the cores of the high Δ optical fibers 621 are opposite in direction in a cross-section orthogonal to the longitudinal direction of the high Δ optical fibers 621 from a vicinity of the center portion toward vicinities of the both end portions, the positions of the cores 621b may be close to the ideal center line J. That is, an influence of the pitch shift caused by the warp may be decreased.

Figure 22B:
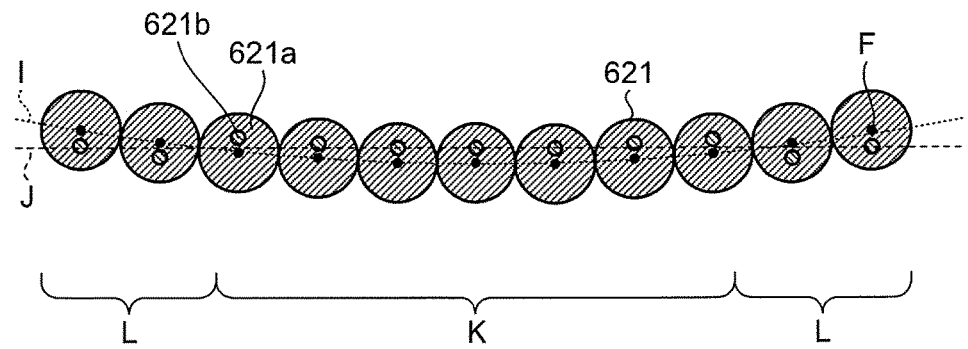
FIG. 22B illustrates other arrangement of the high Δ optical fiber.

In the embodiment, instead of arranging and rotating gradually the high Δ optical fibers 621, all the core eccentricities may be aligned in a predetermined direction (upward in the drawing) within the range K as illustrated in FIG. 22B, and all the core eccentricities may be aligned in the opposite direction (downward in the drawing) within the range L. That is, by configuring such that at least the eccentricity directions of the high Δ optical fibers 621 near the center portion and at least the eccentricity directions of the high Δ optical fibers 621 near the end portions are opposite to each other in a direction substantially orthogonal to an arranging direction of the high Δ optical fibers 621, an influence of the pitch shift caused by a warp may be decreased.

In order to arrange in this manner, for the center high Δ optical fibers 621, positions of the cores 621b may be checked from end surfaces such that the cores are eccentric in predetermined directions, and rotation angles (directions) of the other high Δ optical fibers 621 may be adjusted relative to the center high Δ optical fibers 621 while observing the above-described marks.

According to the sixth embodiment, an influence of a warp of the fixing member 630 may be decreased and a connection loss between an optical device having a high relative refractive index difference and an optical fiber array may be decreased. Therefore, the optical device having the high relative refractive index difference to the single-mode optical fiber may be connected effectively.

Other Embodiment

Figure 23A:
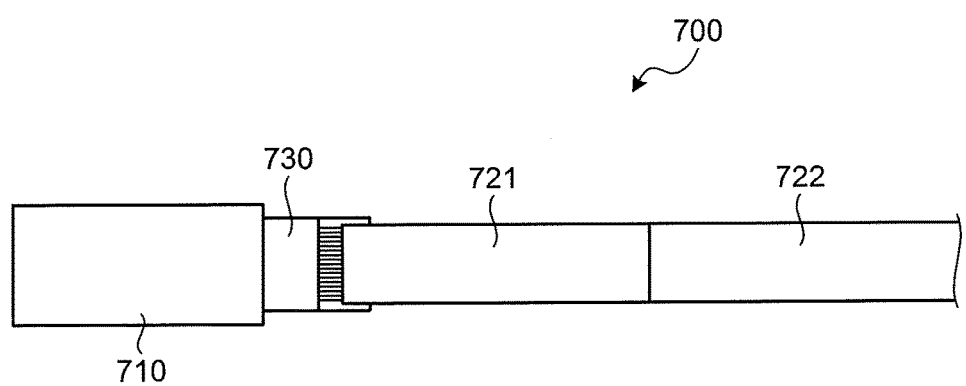
FIG. 23A schematically illustrates a configuration of an optical component according to other embodiment.

Although embodiments in which the optical device having the high relative refractive index difference is connected to the single-mode optical fiber via the high Δ optical fiber were used in the above-described explanations, the disclosure which is carried out is not limited to this. For example, in an optical component 700 illustrated in FIG. 23A, a high Δ optical fiber is not used, and an optical device 710 having a high relative refractive index difference is connected to a single-mode optical fiber 722.

In the optical component 700, short single-mode optical fibers 721 are cut out from one piece of single-mode optical fiber, a tape core wire in which these single-mode optical fibers 721 are arranged is manufactured, and the optical device 710 having the high relative refractive index difference is connected to the original single-mode optical fiber 722 via the tape core wire. Since, in this case as well, the core eccentricity amounts and the cladding outer diameters of the respective single-mode optical fibers 722 are substantially identical, the optical device 710 having the high relative refractive index difference may be connected to the single-mode optical fiber 722 effectively only by aligning the core eccentricity directions.

Figure 23B:
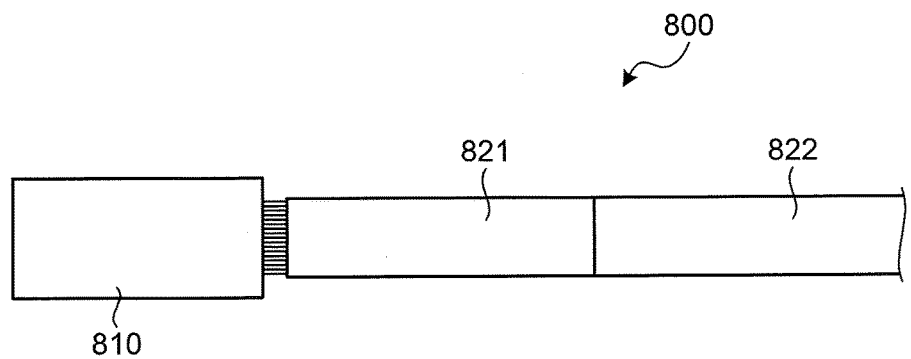
FIG. 23B schematically illustrates a configuration of an optical component according to other embodiment.

A fixing member 730 is not always necessary. For example, as illustrated in FIG. 23B illustrating an optical component 800, an optical device 810 having a high relative refractive index difference may be fused by laser or the like and connected to a high Δ optical fiber 821. Since, in this case as well, the core eccentricity amounts and the cladding outer diameters of the respective high Δ optical fibers 821 forming the tape core wire are substantially identical, the optical device 810 having the high relative refractive index difference may be connected to a single-mode optical fiber 822 effectively only by aligning the core eccentricity directions.

Verification of Effects

Figure 24:
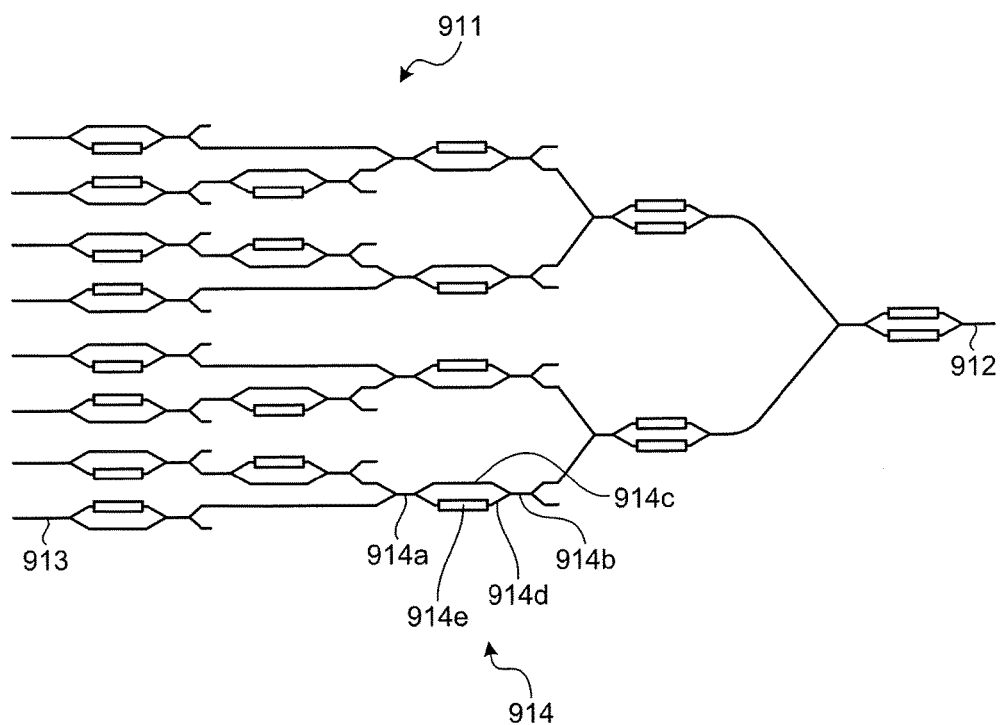
FIG. 24 illustrates a configuration of an optical switch.

Next, results of measuring connection losses of optical components which were actually manufactured according to the above-described embodiments will be explained. FIG. 24 illustrates a configuration of a tree-shaped 8×1 optical switch 911. The optical switch 911 has one common port 912 at an end and eight-split ports 913 at the other end. The optical switch 911 has a plurality of MZIs (Mach-Zehnder interferometers) 914. Couplers 914a, 914b, and two waveguides 914c, 914d sandwiched by the couplers 914a, 914b are provided between input/output ports of the MZI_914. A heater 914e as a heating unit is provided to the waveguide 914d. The optical switch 911 may change a path, through which an optical signal is transmitted, by switching on and off the heater 914e of each MZI_914.

A chip, in which these optical switches 911 were arranged in four arrays, was manufactured by using PLC-manufacturing process technologies such as a flame hydrolysis deposition (FHD) method, a photo-lithography, a reactive ion etching, and the like. After forming a waveguide, a heater, an electrode, and an insulation film were formed, and finally, a contact hole was formed in an electrode pad portion by etching. A relative refractive index difference Δ was 5%, and a chip size was 18×6 mm.

Figure 25:
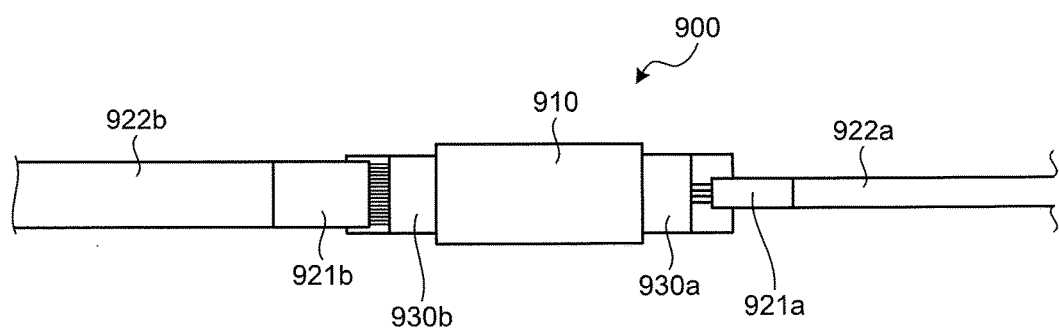
FIG. 25 illustrates a configuration of an optical component.

FIG. 25 illustrates a configuration of an optical component 900 used in an experiment. Optical fiber arrays were connected to both ends of a manufactured 4-array×1-switch (an optical device 910 having a high relative refractive index difference). The optical fiber arrays were manufactured as described below. At first, one piece of high Δ optical fiber was cut into 32 pieces of high Δ optical fibers 921a, 921b in 10 mm lengths. During that, a mark was formed in the longitudinal direction of the original high Δ optical fiber. Relative refractive index differences Δ of the high Δ optical fibers 921a, 921b which were used were Δ2.9%.

Next, the high Δ optical fibers 921a, 921b were formed into tapes to form a tape core wire. During that, the above-described marks were arranged to be directed in a same direction. The length of the tape core wire was 10 mm. The number of the cores of the tape core wire of the high Δ optical fiber 921a was four, and the number of the cores of the tape core wire of the high Δ optical fiber 921b was thirty two. That is, the numbers of the cores of the input fiber array and the output fiber array are thirty two and four respectively.

Next, single-mode optical fibers 922a, 922b were fused to respective ends of the tape core wires of the high Δ optical fibers 921a, 921b such that a gap of mode-field diameters is smoothed at connection points to maintain a low connection loss. Moreover, other ends of the tape core wires of the high Δ optical fibers 921a, 921b were fixed by fixing members 930a, 930b and connected to an optical device 910 having a high relative refractive index difference.

Figure 26:
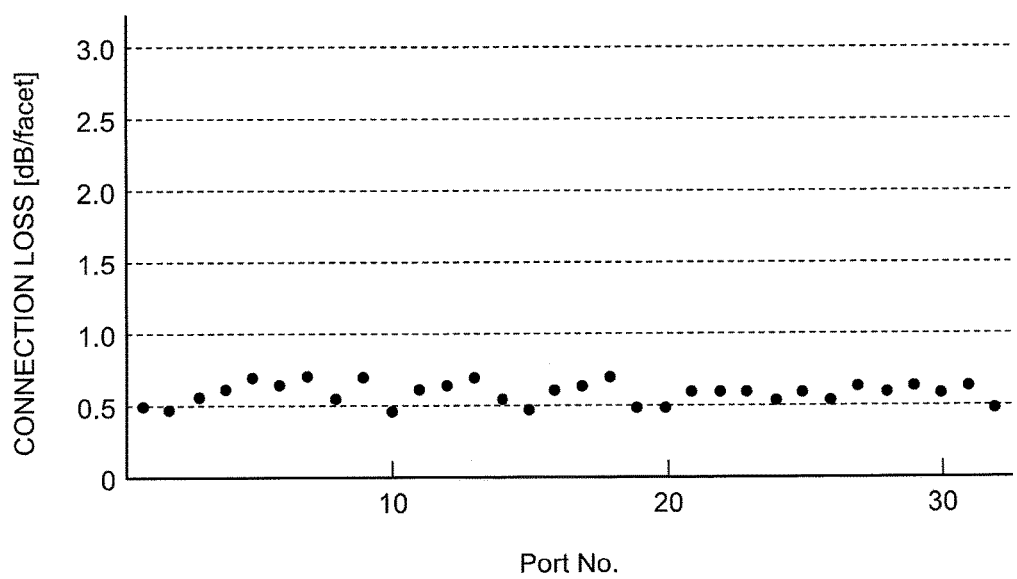
FIG. 26 illustrates a connection loss at each port.

FIG. 26 illustrates a connection loss at each port of the optical component 900 illustrated in FIG. 25. The horizontal axis of a graph illustrated in FIG. 26 indicates respective ports of the thirty two cores, and the vertical axis indicates a connection loss at each port. All the ports achieve losses of 0.7 dB or less which are 1 dB in total in a verification experiment illustrated in FIG. 26. From this result, it was found that the configuration of the optical component 900 may suppress a pitch shift of fiber arrays and has a practical utility.

Although the disclosure has been explained above based on the embodiments, the disclosure is not limited by the above-described embodiments. For example, an optical device introducing a light beam to an end surface of a high-relative-refractive-index-difference optical fiber may be a spot-size convertor configured by, for example, a PLC device, a spatial coupling system, and the like. The disclosure includes a configuration appropriately combining the above-described elements. Further effects or modification examples may be derived by an ordinary skilled person in the art easily. Therefore, further wide aspects of the disclosure are not limited to the above-described embodiments, and various modifications may be made.

The optical component according to the disclosure obtains an effect of decreasing a connection loss between an optical device and an optical fiber inputting light into, or outputting light from, the optical device.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical component comprising:
a high-relative-refractive-index-difference optical fiber;
a single-mode optical fiber fusion-spliced to the high-relative-refractive-index-difference optical fiber, a mode-field diameter of the single-mode optical fiber being greater than a mode-field diameter of the high-relative-refractive-index-difference optical fiber at a wavelength of 1550 nm;
an optical device connected to an end surface of the high-relative-refractive-index-difference optical fiber where the single-mode optical fiber is not fusion-spliced; and
a fixing member configured to fix a relative position of the high-relative-refractive-index-difference optical fiber to the optical device for optically coupling the high-relative-refractive-index-difference optical fiber to the optical device, wherein
a total of a connection loss between the high-relative-refractive-index-difference optical fiber and the single-mode optical fiber at the wavelength of 1550 nm and a connection loss between the high-relative-refractive-index-difference optical fiber and the optical device at the wavelength of 1550 nm is less than a connection loss at the wavelength of 1550 nm when the single-mode optical fiber is connected to the optical device directly,
the high-relative-refractive-index-difference optical fiber is fixed to the fixing member with a coating of a portion of the high-relative-refractive-index-difference optical fiber being removed, and
the portion is sandwiched between an upper plate and a V-shaped groove formed on the fixing member.

2. The optical component according to claim 1, wherein both thickness and width of a core of the optical device are 1.5 μm to 6.5 μm, and
a relative refractive-index difference of the core relative to a cladding of the optical device is 2.5% or more and 10% or less.

3. The optical component according to claim 1, wherein a mode-field diameter of the high-relative-refractive-index-difference optical fiber at the wavelength of 1550 nm is 3.0 μm to 5.0 μm, and a connection loss between the high-relative-refractive-index-difference optical fiber and the optical component at the wavelength of 1550 nm is 3.08 dB or less.

4. The optical component according to claim 3, wherein a relative refractive-index difference of a core relative to a cladding of the high-relative-refractive-index-difference optical fiber is 2.0% to 3.0%.

5. The optical component according to claim 1, wherein a fused point where the high-relative-refractive-index-difference optical fiber is fusion-spliced to the single-mode optical fiber is fixed to the fixing member covered by a coating whose diameter is substantially identical to a diameter of a coating of the single-mode optical fiber.

6. The optical component according to claim 1, wherein the fused point where the high-relative-refractive-index-difference optical fiber is fusion-spliced to the single-mode optical fiber is sandwiched between the V-shaped groove and the upper plate with the fused point being formed such that an outer diameter of the fused point is smaller than outer diameters of the high-relative-refractive-index-difference optical fiber and the single-mode optical fiber around the fused point.

7. The optical component according to claim 1, wherein the fused point where the high-relative-refractive-index-difference optical fiber is fusion-spliced to the single-mode optical fiber is disposed at an outside of a housing enclosing the optical component.

8. The optical component according to claim 1, wherein the high-relative-refractive-index-difference optical fibers and the single-mode optical fibers are coated altogether while the high-relative-refractive-index-difference optical fibers and the single-mode optical fibers are arranged in arrays respectively.

9. The optical component according to claim 6, wherein cladding diameters of the high-relative-refractive-index-difference optical fibers arranged in the arrays are 50 µm to less than 125 µm.

10. The optical component according to claim 1, wherein the high-relative-refractive-index-difference optical fiber and the single-mode optical fiber are polarization-maintaining optical fibers transmitting light while maintaining polarization planes.

11. The optical component according to claim 1, wherein an end surface, on a side of the optical device, of the high-relative-refractive-index-difference optical fiber is formed obliquely relative to a plane which is orthogonal to an optical axis of the high-relative-refractive-index-difference optical fiber at an angle of 16 degrees or less.

12. The optical component according to claim 1, wherein a core of an optical waveguide of the optical device is doped with zirconia.

13. The optical component according to claim 8, wherein the high-relative-refractive-index-difference optical fibers are arrayed such that eccentricity directions of the respective cores are in a predetermined direction to one another in a cross-section which is orthogonal to a longitudinal direction of the high-relative-refractive-index-difference optical fibers.

14. The optical component according to claim 13, wherein the high-relative-refractive-index-difference optical fibers are obtained by cutting one high-relative-refractive-index-difference optical fiber.

15. The optical component according to claim 13, wherein the high-relative-refractive-index-difference optical fibers are fixed with a predetermined interval in the V-shaped groove formed on the fixing member, and the high-relative-refractive-index-difference optical fibers are arranged such that, in the cross-section which is orthogonal to the longitudinal direction of the high-relative-refractive-index-difference optical fibers, the eccentricity directions of the cores of the high-relative-refractive-index-difference optical fibers near at least a center portion and the eccentricity directions of the cores of the high-relative-refractive-index-difference optical fibers near at least an end portion are opposite to one another relative to a direction which is substantially orthogonal to an arraying direction of the high-relative-refractive-index-difference optical fibers.

16. The optical component according to claim 1, wherein a gap among the high-relative-refractive-index-difference optical fiber, the single-mode optical fiber, the V-shaped groove, and the upper plate is filled with an adhesive.

* * * * *

UNITED STATES PATENT AND TRADEMARK OFFICE
CERTIFICATE OF CORRECTION

PATENT NO. : 10,007,073 B2
APPLICATION NO. : 15/470282
DATED : June 26, 2018
INVENTOR(S) : Masanori Takahashi et al.

It is certified that error appears in the above-identified patent and that said Letters Patent is hereby corrected as shown below:

On the Title Page

Item (54) and in the Specification, Column 1, the Title should read:
--AN OPTICAL COMPONENT INCLUDING A HIGH-RELATIVE-REFRACTIVE-INDEX-INDEX-DIFFERENCE OPTICAL FIBER, A SINGLE-MODE OPTICAL FIBER, AN OPTICAL DEVICE, AND A FIXING MEMBER TO FIX A RELATIVE POSITION--

Signed and Sealed this
Nineteenth Day of March, 2019

Andrei Iancu
*Director of the United States Patent and Trademark Office*